US012773706B2

(12) United States Patent
Sakata

(10) Patent No.: US 12,773,706 B2
(45) Date of Patent: Oct. 27, 2026

(54) TRIGGER-TYPE LIQUID EJECTOR

(71) Applicant: YOSHINO KOGYOSHO CO., LTD., Tokyo (JP)

(72) Inventor: Kota Sakata, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 177 days.

(21) Appl. No.: 18/724,514

(22) PCT Filed: Dec. 27, 2022

(86) PCT No.: PCT/JP2022/048268

§ 371 (c)(1),
(2) Date: Jun. 26, 2024

(87) PCT Pub. No.: WO2023/127892

PCT Pub. Date: Jul. 6, 2023

(65) Prior Publication Data

US 2025/0065352 A1 Feb. 27, 2025

(30) Foreign Application Priority Data

Dec. 28, 2021 (JP) ................................ 2021-213778
Dec. 28, 2021 (JP) ................................ 2021-214360

(51) Int. Cl.
*B05B 15/30* (2018.01)
*B05B 11/10* (2023.01)

(52) U.S. Cl.
CPC .......... *B05B 11/1011* (2023.01); *B05B 15/30* (2018.02)

(58) Field of Classification Search
CPC ... B05B 11/1011; B05B 15/30; B05B 11/007; B05B 11/104; B05B 11/1063; B05B 11/0044; B05B 11/1074; B05B 11/0008; B05B 11/1059; B05B 11/1067
See application file for complete search history.

(56) References Cited

U.S. PATENT DOCUMENTS

| | | | |
|---|---|---|---|
| 4,940,186 | A | 7/1990 | Tada |
| 2017/0216863 | A1 | 8/2017 | Kakuta et al. |
| 2019/0217317 | A1 | 7/2019 | Shazuki |

FOREIGN PATENT DOCUMENTS

| | | | | |
|---|---|---|---|---|
| CN | 107073501 | A | 8/2017 | |
| CN | 110536756 | A | 12/2019 | |
| EP | 3 112 036 | A1 | 1/2017 | |
| JP | H10-043648 | A | 2/1998 | |
| JP | H10-192748 | A | 7/1998 | |
| JP | 2000-070785 | A | 3/2000 | |
| JP | 2009-137626 | A | 6/2009 | |
| JP | 2009-202157 | A | 9/2009 | |
| JP | 2012-176384 | A | 9/2012 | |
| JP | 2016193405 | A * | 11/2016 | ........... B05B 11/104 |

(Continued)

OTHER PUBLICATIONS

English transliation (Year: 2019).*

(Continued)

*Primary Examiner* — Qingzhang Zhou
(74) *Attorney, Agent, or Firm* — Oliff PLC

(57) ABSTRACT

A trigger-type liquid ejector includes a nozzle member, an ejector main body, and a mounting cap. The ejector main body includes a vertical supply tube portion and a trigger mechanism. The mounting cap includes a restriction portion.

8 Claims, 8 Drawing Sheets

(56) References Cited

FOREIGN PATENT DOCUMENTS

| | | | | | |
|---|---|---|---|---|---|
| JP | 2017-132535 | A | | 8/2017 | |
| JP | 2017-213497 | A | | 12/2017 | |
| JP | 2017-214076 | A | | 12/2017 | |
| JP | 2017-226474 | A | | 12/2017 | |
| JP | 6626724 | B2 | | 12/2019 | |
| JP | 2019218098 | A | * | 12/2019 | .......... B05B 11/1011 |
| JP | 2021-070516 | A | | 5/2021 | |
| JP | 2021-159841 | A | | 10/2021 | |
| WO | 2021/085520 | A1 | | 5/2021 | |

OTHER PUBLICATIONS

Oct. 15, 2024 Notice of Allowance issuedn in Japanese Patet Application No. 2021-214360.
Feb. 28, 2023 International Search Report issued in International Patent Application No. PCT/JP2022/048268.
Feb. 10, 2026 Search Report issued in European Patent Application No. 22916114.6.
Nov. 6, 2025 Search Report issued in European Patent Application No. 22 916 114.6.
Nov. 12, 2024 Notice of Allowance issued in Japanese Patent Application No. 2021-213778.
Aug. 7, 2026 Office Action issued in Chinese Patent Application No. 202280072686.8. [English copy of Search Report attached hereto].

* cited by examiner

TRIGGER-TYPE LIQUID EJECTOR

TECHNICAL FIELD

The present invention relates to a trigger-type liquid ejector. This is a national stage application of International Patent Application No. PCT/JP2022/048268 filed on Dec. 27, 2022, which claims priority on Japanese Patent Application No. 2021-214360, filed Dec. 28, 2021, and Japanese Patent Application No. 2021-213778, filed Dec. 28, 2021, the contents of which are incorporated herein by reference.

BACKGROUND ART

Trigger-type liquid ejectors, in which a liquid is suctioned up from the inside of a container body in response to an operation of a trigger portion and the liquid is ejected through an ejection hole, are known. The trigger-type liquid ejector described in the following Patent Document 1 includes a piston which move forward and rearward along with movement of a trigger portion, a cylinder of which the inside is compressed and decompressed along with movement of the piston and of which the inside communicates with the inside of a vertical supply tube portion, and a biasing member which is disposed on the inward side of the cylinder and biases the trigger portion forward via the piston.

Moreover, the trigger-type liquid ejector described in the following Patent Document 1 includes a storage cylinder into which a liquid that has passed through the inside of the vertical supply tube portion is supplied in response to rearward movement of the trigger portion, and a storage plunger which is provided inside the storage cylinder, moves toward one side in an axial direction along with supply of a liquid to the inside of the storage cylinder, and is biased toward the other side, thereby being able to continuously eject a liquid.

In addition, regarding trigger-type liquid ejectors of this kind, for example, as described in the following Patent Document 2, a trigger-type liquid ejector including an ejector main body which is mounted in a container body accommodating a liquid, and a nozzle member in which an ejection hole for ejecting a liquid is formed is known.

The ejector main body mainly includes a vertical supply tube portion which suctions up a liquid inside the container body; a connection tube portion which extends forward from the vertical supply tube portion; a trigger portion which is provided so as to be movable rearward in a forward biased state and spouts a liquid to the ejection hole side through the inside of the vertical supply tube portion and the inside of the connection tube portion by moving rearward; a storage cylinder into which a liquid that has passed through the inside of the vertical supply tube portion and inside of the connection tube portion is supplied in response to rearward movement of the trigger portion; and a storage plunger which is movably disposed inside the storage cylinder, moves rearward along with supply of a liquid to the inside of the storage cylinder, and is biased forward by a biasing member.

In the trigger-type liquid ejector described above, while a liquid is stored inside the storage cylinder, a liquid can be ejected to the outside through the ejection hole by operating the trigger portion. Moreover, even when the trigger portion is not being operated, a liquid can be ejected utilizing the storage plunger. Therefore, a liquid can be continuously jetted. The connection tube portion is often formed to have an opening portion in consideration of moldability, for example. In this case, the opening portion is closed (sealed) by mounting a closing plug in a manner of being fitted to the opening portion.

CITATION LIST

Patent Document

[Patent Document 1]
Japanese Unexamined Patent Application, First Publication No. 2021-159841
[Patent Document 2]
Japanese Unexamined Patent Application, First Publication No. 2017-213497

SUMMARY OF INVENTION

Technical Problem

Since the foregoing trigger-type liquid ejector has a heavy ejector main body (head part) having a trigger mechanism, when the ejector main body falls in a manner of facing downward, for example, there is concern that an excessive load may be applied to a part (neck part) that is fitted to a mouth portion of the container body and deformation of the ejector main body, such as bending of the ejector main body at the fitted part acting as a fulcrum, may occur.

In a trigger-type liquid ejector equipped with a storage cylinder, there is a need to store a liquid inside the storage cylinder while a storage plunger is moved rearward. For this reason, it is constituted to push out a liquid inside the storage plunger by moving the storage plunger forward using a biasing member. Therefore, it is constituted such that pressures inside the storage plunger and inside a connection tube portion are likely to rise. For this reason, a high pressure acts on a closing plug closing an opening portion of the connection tube portion so that a stress is likely to act on the closing plug such that it comes off the opening portion. Accordingly, there is a probability of unintentional positional deviation of the closing plug. As a result, for example, there is concern that degradation in sealability and the like may be caused and problems of liquid leakage and the like may be caused.

The present invention has been made in consideration of such circumstances, and an object thereof is to provide a trigger-type liquid ejector in which deformation of an ejector main body having a trigger mechanism can be curbed and provide a trigger-type liquid ejector in which appropriate sealability can be maintained by a closing plug.

Solution to Problem

A first aspect of the present invention is a trigger-type liquid ejector including a nozzle member in which an ejection hole for ejecting a liquid is formed, an ejector main body in which the nozzle member is mounted, and a mounting cap which mounts the ejector main body in a mouth portion of a container body accommodating the liquid. The ejector main body includes a vertical supply tube portion which suctions up a liquid inside the container body, and a trigger mechanism which has a trigger portion provided so as to be movable rearward in a forward biased state, and which causes a liquid to flow from an inside of the vertical supply tube portion toward the ejection hole side in response to rearward movement of the trigger portion. The mounting cap includes a restriction portion which is close to or abuts on the ejector main body in a vertical direction and restricts relative displacement between the mounting cap and the ejector main body.

According to the trigger-type liquid ejector in the first aspect of the present invention, a liquid can flow from the inside of the vertical supply tube portion toward the ejection hole side by operating the trigger portion so as to move it rearward. Accordingly, a liquid can be ejected to the outside through the ejection hole of the nozzle member. Incidentally, the ejector main body is mounted in the mouth portion of the container body by the mounting cap. Particularly, the mounting cap is provided with the restriction portion which is close to or abuts on the ejector main body in the vertical direction. Therefore, for instance, even if the ejector main body tends to be deformed close to the container body side at a part where the ejector main body is fitted to the mouth portion of the container body as a fulcrum, deformation thereof can be restricted due to abutment on the restriction portion. Accordingly, it is possible to provide a durable trigger-type liquid ejector against a fall and the like.

According to a second aspect of the present invention, in the trigger-type liquid ejector according to the first aspect, the vertical supply tube portion includes an inner tube, and an outer tube which is externally fitted to the inner tube. The inner tube is provided with an insertion portion into which a part of the outer tube is inserted in the vertical direction. The restriction portion is formed in a tubular shape surrounding the outward side of the insertion portion.

In this case, the parts of the inner tube and the outer tube fitted to each other due to insertion in the vertical direction are protected by the tubular restriction portion over the whole circumference from the outward side. For this reason, a bending force or a load applied to the parts inserted into the insertion portion can be reduced, and breakage or disconnection can be curbed.

According to a third aspect of the present invention, in the trigger-type liquid ejector according to the first aspect or the second aspect, the trigger mechanism includes a main cylinder which communicates with the vertical supply tube portion and opens forward, and a main piston which has a sliding portion capable of sliding on an inner circumferential surface of the main cylinder and moves in a forward-rearward direction with respect to the main cylinder along with movement of the trigger portion in the forward-rearward direction. The ejector main body includes a main cylinder mounting tube portion which protrudes forward from the vertical supply tube portion and in which the main cylinder is mounted. The mounting cap includes a mounting portion in which the vertical supply tube portion is inserted into an inward side thereof and which is mounted in the mouth portion of the container body. The restriction portion extends upward from the mounting portion, is close to or abuts on a lower portion of the main cylinder mounting tube portion, and restricts relative displacement between the mounting cap and the ejector main body.

In this case, the restriction portion is close to or abuts on the lower portion of the main cylinder mounting tube portion in the vertical direction, which is a strength member for mounting the main cylinder. For this reason, a load applied from the restriction portion when deformation of the ejector main body is restricted can be sufficiently received on the ejector main body side.

According to a fourth aspect of the present invention, the trigger-type liquid ejector according to the third aspect further includes a second restriction portion which extends downward from the lower portion of the main cylinder mounting tube portion, is close to or abuts on a front side of the mounting cap, and restricts relative displacement between the mounting cap and the ejector main body.

In this case, even if a greater load is applied to the ejector main body and the ejector main body tends to be deformed closer to the container body side from a state of being restricted by the restriction portion, the second restriction portion will abut on the front side of the mounting cap. For this reason, deformation thereof can be restricted.

According to a fifth aspect of the present invention, in the trigger-type liquid ejector according to any one aspect of the first to fourth aspects, the ejector main body includes a storage cylinder into which the liquid that has passed through the inside of the vertical supply tube portion is supplied in response to rearward movement of the trigger portion, and a storage plunger which is provided inside the storage cylinder so as to be movable in an axial direction along a center axis of the storage cylinder, moves toward one side in the axial direction along with supply of the liquid to the inside of the storage cylinder, and is biased toward the other side.

In this case, the inside of the storage cylinder can be compressed by supplying a liquid from the inside of the vertical supply tube portion to the inside of the storage cylinder. Therefore, the storage plunger can be pressurized toward one side in the axial direction against a biasing force toward the other side in the axial direction so that the storage plunger can be moved toward one side in the axial direction while a liquid is ejected. For this reason, every time an operation of pulling the trigger portion is performed, while a liquid is stored inside (fills) the storage cylinder, a liquid can be ejected by moving the storage plunger to one side in the axial direction. If the operation of the trigger portion is stopped after the inside of the storage cylinder is filled with a liquid, supply of a liquid to the inside of the storage cylinder through the inside of the vertical supply tube portion stops. However, the storage plunger starts restoration movement toward the other side in the axial direction. Accordingly, a liquid filling the inside of the storage cylinder can be pushed out toward the ejection hole side from the inside of the storage cylinder and can be ejected through the ejection hole. Therefore, a liquid can be continuously ejected. When a liquid is continuously ejected in this manner, the ejector main body becomes heavier. However, even in such a case, the restriction portion makes it possible to provide a durable trigger-type liquid ejector against a fall and the like.

A sixth aspect of the present invention is a trigger-type liquid ejector including an ejector main body which is mounted in a container body accommodating a liquid, and a nozzle member which is mounted in the ejector main body, and in which an ejection hole for ejecting a liquid is formed. The ejector main body includes a vertical supply tube portion which suctions up a liquid inside the container body, a connection tube portion which extends from the vertical supply tube portion, and which has an opening portion opening to an outside of the ejector main body, a trigger mechanism which has a trigger portion provided so as to be movable rearward in a forward biased state, and which causes the liquid to flow from the vertical supply tube portion toward the ejection hole side through an inside of the connection tube portion in response to rearward movement of the trigger portion, a storage cylinder in which a supply hole communicating with the inside of the connection tube portion is formed, and into which the liquid that has passed through the inside of the vertical supply tube portion and the inside of the connection tube portion is supplied through the supply hole in response to rearward movement of the trigger portion, and a storage plunger which is provided inside the storage cylinder so as to be movable in an axial direction along a center axis of the storage cylinder, which moves toward one side in the axial direction along with supply of a liquid to the inside of the storage cylinder, and which is biased toward the other side. The connection tube portion is provided with a closing plug which is mounted so as to close the opening portion. The closing plug includes a plug main body which is fitted to the inward side of the connection tube portion, and which closes the opening portion, and an outer tube which is formed to extend over a whole circumference of the connection tube portion in a manner of surrounding the connection tube portion from the outward side in a radial direction, and which is fitted to an outward side of the connection tube portion over the whole circumference.

According to the trigger-type liquid ejector in the sixth aspect of the present invention, a liquid can flow from the inside of the vertical supply tube portion toward the ejection hole side through the inside of the connection tube portion by operating the trigger portion so as to move it rearward. Accordingly, a liquid can be ejected to the outside through the ejection hole of the nozzle member. Further, the inside of the storage cylinder can be compressed by supplying a liquid from the inside of the connection tube portion to the inside of the storage cylinder through the supply hole. Therefore, the storage plunger can be pressurized toward one side in the axial direction against a biasing force toward the other side in the axial direction so that the storage plunger can be moved toward one side in the axial direction while a liquid is ejected. For this reason, every time an operation of pulling the trigger portion is performed, while a liquid is stored inside (fills) the storage cylinder, a liquid can be ejected by moving the storage plunger to one side in the axial direction. If the operation of the trigger portion is stopped after the inside of the storage cylinder is filled with a liquid, supply of a liquid to the inside of the storage cylinder through the inside of the vertical supply tube portion and inside of the connection tube portion stops. However, the storage plunger starts restoration movement toward the other side in the axial direction. Accordingly, a liquid filling the inside of the storage cylinder can be pushed out toward the ejection hole side from the inside of the storage cylinder and can be ejected through the ejection hole. Therefore, a liquid can be continuously ejected.

Incidentally, the opening portion of the connection tube portion communicating with the inside of the vertical supply tube portion and the inside of the storage cylinder is closed (sealed) by the closing plug. Particularly, the closing plug is mounted with the connection tube portion sandwiched therebetween in the radial direction utilizing the plug main body fitted to the inward side of the connection tube portion and the outer tube fitted to the outward side of the connection tube portion over the whole circumference. Therefore, even if the internal pressure in the connection tube portion is high and this makes the plug main body receive a stress causing it to come out and fall from the inside of the opening portion, relative movement of the entire closing plug with respect to the connection tube portion can be curbed by being sandwiched between the plug main body and the outer tube. Accordingly, unintentional positional deviation or the like of the closing plug can be curbed, appropriate sealability of the opening portion can be maintained, and occurrence of liquid leakage or the like can be prevented.

In addition to this, when the internal pressure in the connection tube portion is high, the connection tube portion is likely to be deformed in a manner of expanding to the outward side in the radial direction due to the internal pressure. At this time, for instance, when the closing plug is not equipped with the outer tube and is equipped with only the plug main body, there is a probability that a gap will be formed between the plug main body and the connection tube portion and liquid leakage or the like will be caused. However, since the outer tube of the closing plug is formed to extend over the whole circumference of the connection tube portion in a manner of surrounding the connection tube portion from the outward side and is fitted to the outward side of the connection tube portion over the whole circumference, deformation of the connection tube portion expanding to the outward side in the radial direction can be curbed utilizing the outer tube. For this reason, a gap is less likely to be formed between the plug main body and the connection tube portion so that high sealability can be realized. From this, it is possible to provide a trigger-type liquid ejector suitable for continuous jetting.

According to a seventh aspect of the present invention, in the trigger-type liquid ejector according to the sixth aspect, the closing plug includes a locking piece which is formed integrally with the outer tube, and which is locked with the ejector main body. The locking piece includes an extension portion which extends toward the vertical supply tube portion beyond the outer tube along the connection tube portion, and a locking portion which is formed to protrude in the radial direction of the connection tube portion from the extension portion and is locked with a locked portion formed in the ejector main body.

In this case, in addition to mounting the closing plug utilizing the plug main body and the outer tube with the connection tube portion sandwiched therebetween in the radial direction, the locking piece can be locked with the ejector main body. Specifically, disconnection or the like of the closing plug can be prevented by locking the locking portion formed in the extension portion with the locked portion formed in the ejector main body so that movement of the closing plug causing it to come out and fall from the inside of the opening portion can be effectively curbed. Therefore, even when the internal pressure in the connection tube portion becomes high, sealability of the opening portion can be maintained more appropriately. Particularly, since the locking portion is formed in the extension portion, for example, the locking portion can be locked with the locked portion while the extension portion is caused to suitably deflect in the radial direction. Therefore, mounting work of the closing plug with respect to the opening portion can be easily performed.

According to an eighth aspect of the present invention, in the trigger-type liquid ejector according to the seventh aspect, the plug main body includes a closing wall which closes the opening portion, an inner tube which is joined to an outer circumferential edge portion of the closing wall, and which is fitted to the inward side of the connection tube portion, and a flange portion which protrudes toward the outward side of the connection tube portion in the radial direction from the inner tube, and which comes into contact with an opening edge of the connection tube portion.

In this case, since the plug main body can be formed in a bottomed tubular shape having the closing wall and the inner tube, a lightweight plug main body can be formed. Furthermore, for example, since the amount of synthetic resin required to form the plug main body can be reduced, it is easy to reduce costs. Moreover, since the plug main body can be mounted on the inward side of the connection tube portion such that the flange portion comes into contact with the opening edge of the connection tube portion, it is easy to positionally set a mounting position of the plug main body and it is easy to perform mounting work.

Advantageous Effects of Invention

According to a trigger-type liquid ejector of the present invention, deformation of an ejector main body having a trigger mechanism can be curbed. Moreover, it is possible to provide a trigger-type liquid ejector in which appropriate sealability can be maintained by a closing plug.

DESCRIPTION OF EMBODIMENTS

First Embodiment

Hereinafter, a trigger-type liquid ejector according to a first embodiment of the present invention will be described with reference to the drawings. In the present embodiment, an ejection container in which a trigger-type liquid ejector is attached to a container body will be described as an example.

Figure 1:
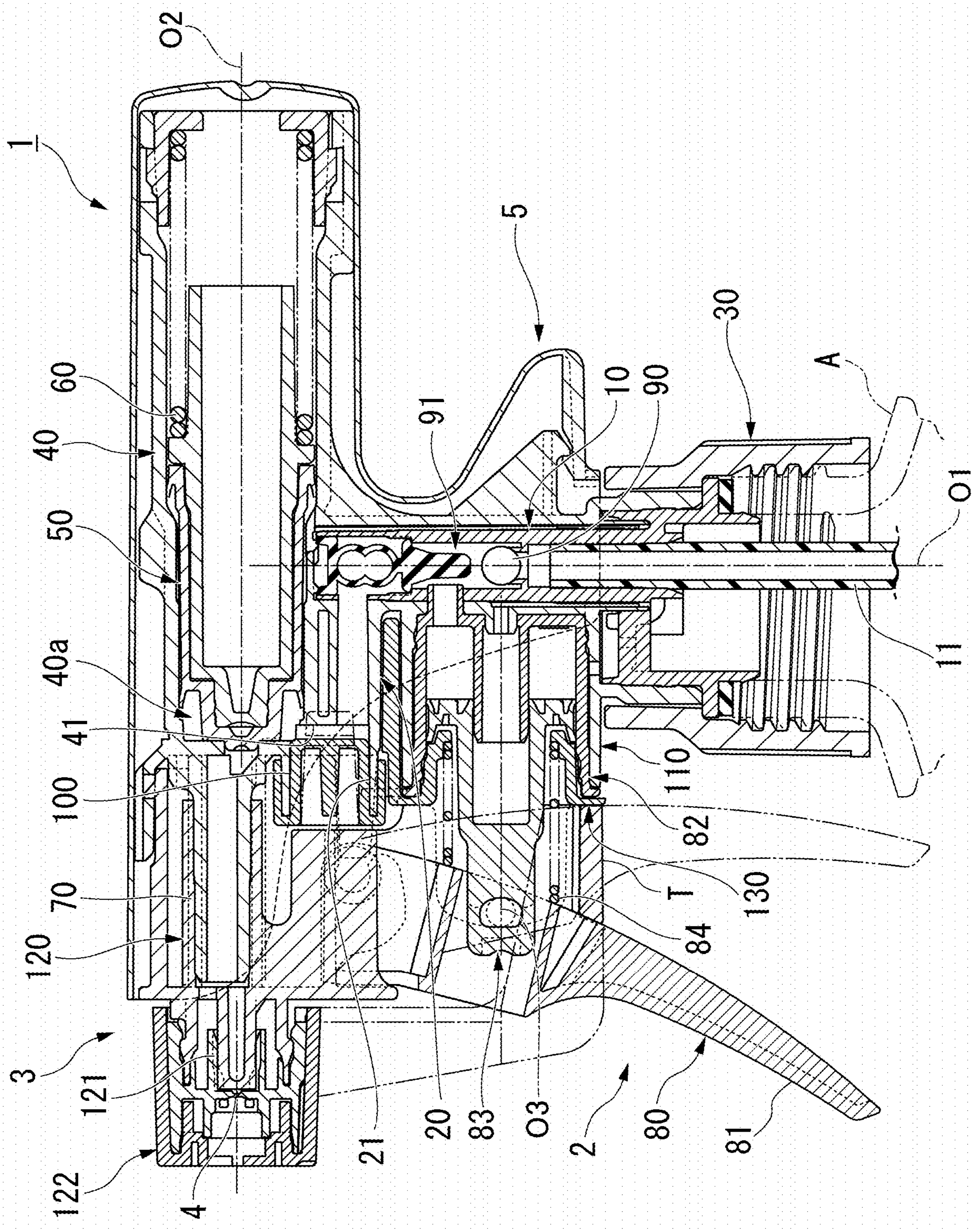
FIG. 1 is a longitudinal sectional view of a trigger-type liquid ejector according to a first embodiment of the present invention.

As shown in FIG. 1, a trigger-type liquid ejector 1 of the first embodiment includes a mounting cap 30 which is mounted in a mouth portion of a container body A accommodating a liquid, an ejector main body 2 which is mounted in the container body A via the mounting cap 30, and a nozzle member 3 in which an ejection hole 4 for ejecting a liquid is formed and which is mounted in the ejector main body 2. The ejector main body 2 and the nozzle member 3 are covered by a cover body 5. Unless otherwise specified, each of the constituent components of the trigger-type liquid ejector 1 is a molded article made of a synthetic resin.

(Ejector Main Body)

The ejector main body 2 mainly includes a vertical supply tube portion 10, a connection tube portion 20, a storage cylinder 40, a storage plunger 50, a plunger biasing member 60, a spouting tube portion 70, a trigger mechanism 80, a ball valve 90, and a storage valve 91.

In the present embodiment, a center axis of the vertical supply tube portion 10 will be referred to as an axis O1, the container body A side along this axis O1 will be referred to as a lower side, a side opposite thereto will be referred to as an upper side, and a direction along the axis O1 will be referred to as a vertical direction. In addition, in a plan view in the vertical direction, one direction intersecting the axis O1 will be referred to as a forward-rearward direction, and a direction bidirectionally orthogonal to the vertical direction and the forward-rearward direction will be referred to as a lateral direction.

Moreover, in the present embodiment, a center axis of the storage cylinder 40 will be referred to as an axis O2. In the present embodiment, the axis O2 extends in the forward-rearward direction. Therefore, in the present embodiment, the forward-rearward direction corresponds to an axial direction along the center axis of the storage cylinder 40. In the present embodiment, the rear side corresponds to one side in the axial direction along the center axis of the storage cylinder 40, and the front side corresponds to the other side in the axial direction along the center axis of the storage cylinder 40. However, the axial direction along the axis O2 may not coincide with the forward-rearward direction.

The vertical supply tube portion 10 has a function of suctioning up a liquid inside the container body A extending in the vertical direction. The vertical supply tube portion 10 is mounted in the container body A by the mounting cap 30. An upper portion of a pipe 11 extending in the vertical direction and suctioning up a liquid from the container body A is fitted to the vertical supply tube portion 10.

As shown in FIG. 1, an upper end portion of the vertical supply tube portion 10 is provided with the connection tube portion 20 which extends forward. The connection tube portion 20 is formed in a tubular shape having an opening portion 21 which opens forward in the ejector main body 2 and communicates with the inside of the vertical supply tube portion 10. A closing plug 100 for closing (sealing) the opening portion 21 is mounted in the opening portion 21 of the connection tube portion 20.

A main cylinder mounting tube portion 110 is provided below the connection tube portion 20 and above the mounting cap 30. The main cylinder mounting tube portion 110 protrudes forward from the vertical supply tube portion 10 and opens forward. The inside of the main cylinder mounting tube portion 110 is fitted to a main cylinder 82. The main cylinder 82 is formed in a bottomed tubular shape opening forward and having a closed rear side. The inside of the main cylinder 82 communicates with the inside of the vertical supply tube portion 10.

The storage cylinder 40 is disposed above the vertical supply tube portion 10 and the connection tube portion 20. A rear end of the storage cylinder 40 protrudes rearward beyond a rear end of the mounting cap 30. In addition, a front end of the storage cylinder is positioned in front of the axis O1. In the present embodiment, a lower end portion of the storage cylinder 40 is formed integrally with the upper end portion of the vertical supply tube portion 10 and an upper end portion of the connection tube portion 20. A liquid that has passed through the inside of the vertical supply tube portion 10 and the inside of the connection tube portion 20 is supplied to the inside of the storage cylinder 40 (a storage space 40*a* which will be described below) in response to rearward rocking of a trigger portion 81. Specifically, a supply hole 41 communicating with the inside of the connection tube portion 20 is formed in a lower side part of a front end portion in the storage cylinder 40. The supply hole 41 opens in a part positioned behind the closing plug 100, which will be described below. Accordingly, a liquid that has passed through the inside of the vertical supply tube portion 10 and the inside of the connection tube portion 20 can be supplied to inside of the storage cylinder 40 through the supply hole 41.

The storage plunger 50 is disposed so as to be movable in the forward-rearward direction along the axis O2 inside the storage cylinder 40. Accordingly, the storage plunger 50 tightly slides in the forward-rearward direction inside the storage cylinder 40. The storage plunger 50 moves rearward along with supply of a liquid to the inside of the storage cylinder 40. The storage plunger 50 cuts off communication between the inside of the vertical supply tube portion 10 and the ejection hole 4 through the inside of the connection tube portion 20 and allows communication between the inside of the vertical supply tube portion 10 and the ejection hole 4 through the inside of the connection tube portion 20 when it has moved rearward. Namely, the storage plunger 50 cuts off communication between the inside of the vertical supply tube portion 10 and the ejection hole 4 (inside of the spouting tube portion 70) through the inside of the connection tube portion 20 at the forefront position and allows communication between the inside of the vertical supply tube portion 10 and the ejection hole 4 (inside of the spouting tube portion 70) through the inside of the connection tube portion 20 when it has moved rearward from the forefront position. In the storage cylinder 40, the space positioned in front of the storage plunger 50 functions as the storage space 40*a*.

The storage space 40*a* stores a liquid that has passed through the inside of the vertical supply tube portion 10 and the inside of the connection tube portion 20 and has passed through the supply hole 41. The storage space 40*a* expands when the storage plunger 50 moves rearward in response to supply of a liquid. The storage space 40*a* can also communicate with the inside of the spouting tube portion 70, which will be described below.

The plunger biasing member 60 biases the storage plunger 50 forward. The plunger biasing member 60 is disposed behind the storage plunger 50 inside the storage cylinder 40. The plunger biasing member 60 biases the storage plunger 50 forward in an initial state before the trigger portion 81 is operated. Accordingly, the storage plunger 50 is positioned at the forefront position. The plunger biasing member 60 is a metal coil spring which is provided coaxially with the axis O2. However, for example, a resin spring may be used or other elastic members may also be used as the plunger biasing member 60.

In the storage cylinder 40 and the storage plunger 50 constituted as described above, a liquid inside the storage space 40*a* can be compressed until the storage plunger 50 moves rearward. Thereafter, if the liquid pressure in the storage space 40*a* reaches a predetermined value, the storage plunger 50 moves rearward against the plunger biasing member 60. Accordingly, a liquid in the storage space 40*a* can be supplied to the ejection hole 4 side. Therefore, the storage plunger 50 can function as an accumulator valve.

The spouting tube portion 70 extends forward from the storage cylinder 40. The spouting tube portion 70 communicates with the inside of the vertical supply tube portion 10 through the inside of the storage cylinder 40 (storage space 40*a*) and the inside of the connection tube portion 20. Accordingly, the spouting tube portion 70 can lead a liquid that has passed through the inside of the vertical supply tube portion 10, the inside of the connection tube portion 20, and the inside of the storage cylinder 40 (storage space 40*a*) to the ejection hole 4.

The trigger mechanism 80 includes the trigger portion 81, the main cylinder 82, a main piston 83, and a biasing member 84. The trigger mechanism 80 can cause a liquid to flow from the inside of the vertical supply tube portion 10 toward the ejection hole 4 side through the inside of the connection tube portion 20 in response to rearward rocking of the trigger portion 81.

The trigger portion 81 is disposed in front of the vertical supply tube portion 10 so as to be movable rearward in a forward biased state. The trigger portion 81 is formed to extend in the vertical direction and is disposed below the spouting tube portion 70. In the trigger portion 81, an upper end portion is pivotally supported by the nozzle member 3 so as to be rockable in the forward-rearward direction, and a lower end portion is disposed in front of the main cylinder 82.

In the illustrated example, a stopper T is provided in a gap between the trigger portion 81 and the main cylinder 82 in the forward-rearward direction. The stopper T restricts rearward rocking of the trigger portion 81 by abutting on each of the trigger portion 81 and the main cylinder 82. However, the stopper T is not essential and may not be provided.

The main piston 83 is disposed inside the main cylinder 82 so as to be movable in the forward-rearward direction. The main piston 83 can move in the forward-rearward direction in association with rocking of the trigger portion 81. Accordingly, the inside of the main cylinder 82 is compressed and decompressed along with movement of the main piston 83 in the forward-rearward direction. The main piston 83 is formed in a topped tubular shape opening rearward and having a closed front side.

The main piston 83 is biased forward via the trigger portion 81 due to a biasing force of the biasing member 84. The main piston 83 moves rearward along with rearward rocking of the trigger portion 81 and is inserted into the main cylinder 82. When the trigger portion 81 is at the forefront rocking position, the main piston 83 is positioned at the forefront position in a manner corresponding thereto.

For example, the biasing member 84 is a metal coil spring. The biasing member 84 is provided coaxially with the main piston 83 and the main cylinder 82 and biases the trigger portion 81, to which the main piston 83 is coupled, forward. The biasing member 84 is disposed between a spring receiver 130, which is mounted in an opening portion in front of the main cylinder 82, and the trigger portion 81.

However, the material of the biasing member 84 is not limited to a metal, and a resin spring or the like may be employed, for example.

The ball valve 90 and the storage valve 91 are provided inside the vertical supply tube portion 10.

The ball valve 90 serves as a check valve cutting off communication between the inside of the container body A and the inside of the main cylinder 82 through the inside of the vertical supply tube portion 10 when the inside of the main cylinder 82 is compressed, and allowing communication between the inside of the container body A and the inside of the main cylinder 82 through the inside of the vertical supply tube portion 10 by being displaced upward when the inside of the main cylinder 82 is decompressed.

The storage valve 91 is disposed above the ball valve 90. The storage valve 91 serves as a check valve allowing supply of a liquid to the inside of the storage cylinder 40 from the inside of the vertical supply tube portion 10 through the inside of the connection tube portion 20 and restricting outflow of a liquid to the inside of the vertical supply tube portion 10 from the inside of the storage cylinder 40 through the inside of the connection tube portion 20.

The cover body 5 is formed to cover the entire vertical supply tube portion 10 except for the lower end portion, the entire spouting tube portion 70, and the entire storage cylinder 40 at least from both sides in the lateral direction and from above.

(Nozzle Member)

The nozzle member 3 is assembled to the ejector main body 2 mainly utilizing the spouting tube portion 70.

The nozzle member 3 includes a mounting tube portion 120 which is externally fitted to the spouting tube portion 70 from the front, a nozzle shaft portion 121 which is positioned on the inward side of the front end portion in the mounting tube portion 120, and a nozzle cap 122 which is mounted in the nozzle shaft portion 121. The ejection hole 4 opening forward and ejecting a liquid forward is formed in the nozzle cap 122.

(Mounting Cap)

In the trigger-type liquid ejector 1 constituted as above, a structure around the mounting cap 30 and the mounting cap 30 described above will be described.

Figure 2:
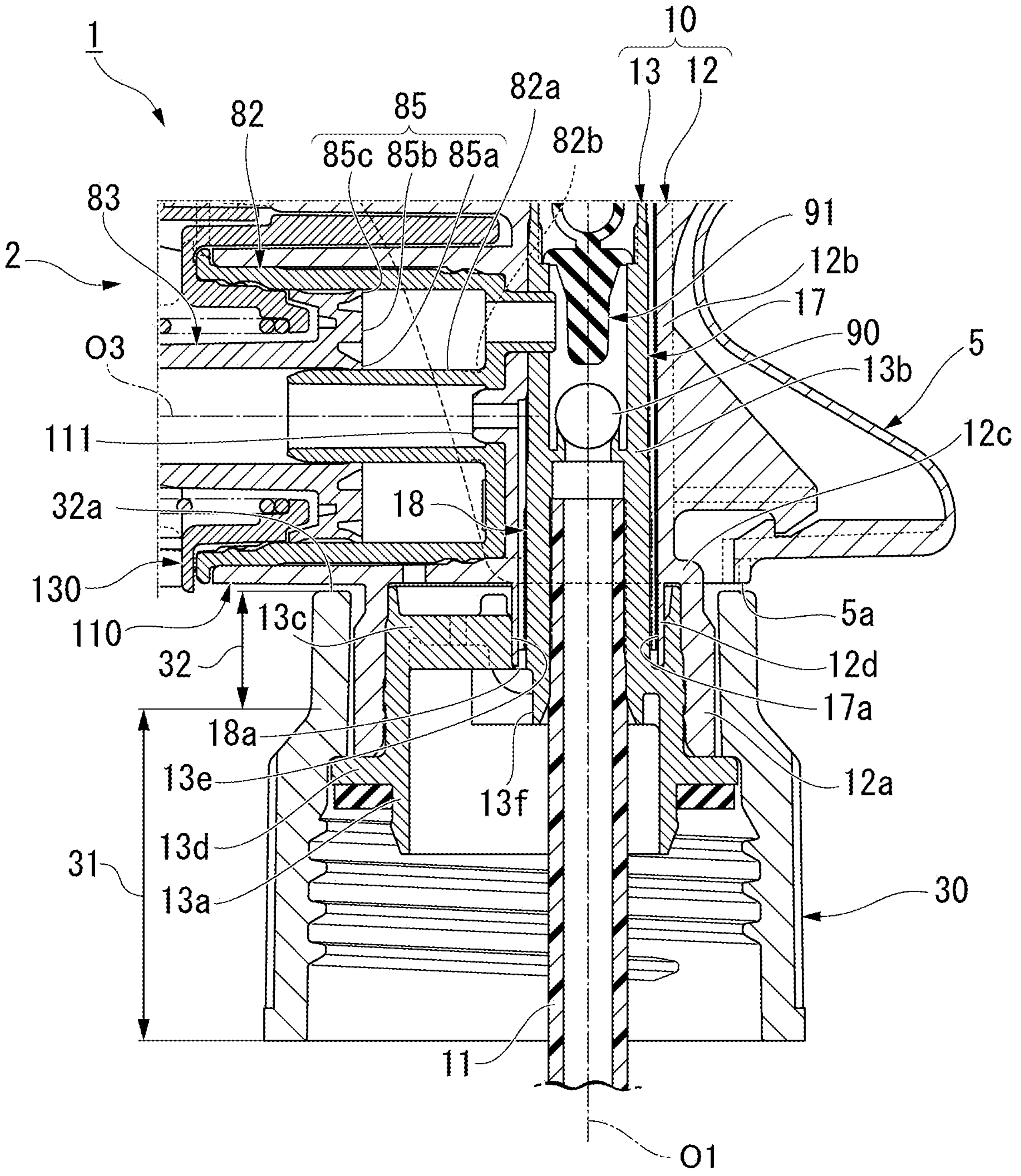
FIG. 2 is an enlarged view of a main part of the trigger-type liquid ejector shown in FIG. 1.

As shown in FIG. 2, the main cylinder 82 having a bottomed tubular shape opening forward is provided with a tubular guide tube 82*a* which protrudes forward from a central part of a rear wall portion thereof. A front end portion of the guide tube 82*a* is positioned behind a front end portion of the main cylinder 82. A bottom portion of the guide tube 82*a* is formed in an annular shape, and a fitting tube portion 111 provided in the main cylinder mounting tube portion 110 is fitted to the inward side thereof. A front end portion of the fitting tube portion 111 protrudes to the inside of the guide tube 82*a*. The guide tube 82*a* is provided coaxially with the fitting tube portion 111.

In the present embodiment, the center axis coaxial with the main cylinder 82, the guide tube 82*a*, the main cylinder mounting tube portion 110, and the fitting tube portion 111 extending in the forward-rearward direction will be referred to as an axis O3. Moreover, in a plan view in the direction of the axis O3, a direction intersecting the axis O3 will be referred to as a radial direction, and a direction surrounding the axis O3 will be referred to as a circumferential direction.

The main piston 83 includes a sliding portion 85 which is disposed inside the main cylinder 82 so as to be movable in the forward-rearward direction. The sliding portion 85 is provided in an annular shape in a rear end portion of the main piston 83 having a topped tubular shape. The guide tube 82*a* is inserted into the inward side of the sliding portion 85. An annular recessed portion 82*b* is formed on an outer circumferential surface in a rear end portion of the guide tube 82*a*.

The sliding portion 85 includes an inner lip portion 85*a* which comes into sliding contact with an outer circumferential surface of the guide tube 82*a*, a lip coupling portion 85*b* which extends toward the outward side in the radial direction from the inner lip portion 85*a*, and outer lip portions 85*c* which are joined to the outward side of the lip coupling portion 85*b* in the radial direction and come into sliding contact with an inner circumferential surface of the main cylinder 82. A rear end portion of the inner lip portion 85*a* extends to the inward side in the radial direction and comes into sliding contact with the outer circumferential surface of the guide tube 82*a*. Accordingly, sealability is secured between the inner lip portion 85*a* and the outer circumferential surface of the guide tube 82*a*.

The lip coupling portion 85*b* is formed in an annular shape coupling the inner lip portion 85*a* and the outer lip portions 85*c* to each other in the radial direction. A surface of the lip coupling portion 85*b* facing forward is formed in a flat surface shape. A pair of outer lip portions 85*c* are formed in the front and the rear in a manner of respectively increasing in diameter as they go forward and rearward from an outer circumferential end of the lip coupling portion 85*b* and come into sliding contact with the inner circumferential surface of the main cylinder 82. Accordingly, sealability is secured between the outer lip portions 85*c* and the inner circumferential surface of the main cylinder 82.

The inner lip portion 85*a* reaches the recessed portion 82*b* when the main piston 83 is positioned at the rearmost position. If the inner lip portion 85*a* reaches the recessed portion 82*b* of the guide tube 82*a*, a slight gap is formed between the inner lip portion 85*a* and the recessed portion 82*b*. Through this gap, the inside of the guide tube 82*a* of the main cylinder 82 communicates with a gap between an inner circumferential surface of the main piston 83 and the outer circumferential surface of the guide tube 82*a*. Accordingly, the inside of the main cylinder 82 communicates with the inside of the fitting tube portion 111 through the inside of the guide tube 82*a*.

The vertical supply tube portion 10 extends in the vertical direction and suctions up a liquid from the container body A (refer to FIG. 1). The vertical supply tube portion 10 has an outer tube 12, and an inner tube 13 which is fitted into the outer tube 12. The axis O1 of the vertical supply tube portion 10 constituted of the outer tube 12 and the inner tube 13 is positioned behind a container axis of the container body A.

The outer tube 12 has a large diameter portion 12*a*, a small diameter portion 12*b* which is disposed above the large diameter portion 12*a* and has a smaller diameter than the large diameter portion 12*a*, an annular coupling portion 12*c* which couples an upper end portion of the large diameter portion 12*a* and a lower end portion of the small diameter portion 12*b*, and an insertion tube portion 12*d* which is suspended downward from an inner circumferential edge of the annular coupling portion 12*c*. The small diameter portion 12*b* is formed in a cylindrical shape and is provided coaxially with the axis O1. An upper end portion of the small diameter portion 12*b* is formed integrally with the storage cylinder 40 (refer to FIG. 1). Accordingly, the outer tube 12 constituting the vertical supply tube portion 10 is formed integrally with the storage cylinder 40.

The inner tube 13 has a large diameter portion 13*a*, a small diameter portion 13*b* which is disposed on the inward side of the large diameter portion 13*a* in the radial direction and has a smaller diameter than the large diameter portion 13*a*, and an annular coupling portion 13*c* which couples an inner circumferential surface of the large diameter portion 13*a* and an outer circumferential surface of the small diameter portion 13*b* in the radial direction.

The large diameter portion 13*a* is provided inside the large diameter portion 12*a* of the outer tube 12. A lower end portion of the large diameter portion 13*a* protrudes downward beyond the large diameter portion 12*a* of the outer tube 12 and is fitted to the inward side of the mouth portion of the container body A. An annular flange portion 13*d* protruding toward the outward side of the large diameter portion 13*a* in the radial direction is formed in a part of the large diameter portion 13*a* protruding downward beyond the large diameter portion 12*a* of the outer tube 12. The flange portion 13*d* is provided inside an upper end portion of a mounting portion 31 having a topped tubular shape of the mounting cap 30 mounted (for example, screwed) in the mouth portion of the container body A and rotatably locks the upper end portion of the mounting portion 31 around the axis thereof. The flange portion 13*d* is sandwiched between the upper end portion of the mounting portion 31 and an upper end opening edge in the mouth portion of the container body A in the vertical direction.

The small diameter portion 13*b* is provided coaxially with the axis O1 and is formed in a cylindrical shape opening on both sides in the vertical direction. The small diameter portion 13*b* is provided inside the small diameter portion 12*b* of the outer tube 12. An upper end opening edge of the small diameter portion 13*b* is slightly separated downward from an upper end portion of the outer tube 12. The upper portion of the pipe 11 extending in the vertical direction and suctioning up a liquid from the container body A is fitted to the inward side of a lower side part of the small diameter portion 13*b*. A lower end opening portion of the pipe 11 is positioned in the bottom portion (not shown) of the container body A.

The annular coupling portion 13*c* is formed in a state with a step in the vertical direction such that a part positioned on a side behind the small diameter portion 13*b* is positioned below a part positioned on a side in front of the small diameter portion 13*b*. However, it is not limited to this case, and the annular coupling portion 13*c* may be formed to maintain an equivalent height over the whole circumference. An insertion portion 13*e* is provided in the vertical direction around the small diameter portion 13*b* of the annular coupling portion 13*c*. The insertion portion 13*e* is formed in an annular shape at a uniform depth from an upper surface of the annular coupling portion 13*c* about the axis O1. The insertion portion 13*e* penetrates the annular coupling portion 13*c* to a lower surface thereof on a side in front of the small diameter portion 13*b* but does not penetrate the annular coupling portion 13*c* to the lower surface on a side behind the small diameter portion 13*b*.

An annular pipe fitting tube 13*f* protruding downward beyond the annular coupling portion 13*c* is formed in the small diameter portion 13*b*. The pipe fitting tube 13*f* opens downward and is formed in a tapered shape in a longitudinal sectional view in which the inner circumferential surface gradually increases in diameter as it goes downward. The pipe 11 is fitted to the inward side of the small diameter portion 13*b* by being inserted from below through the pipe fitting tube 13*f*.

A recovery passage 17 is provided between the outer tube 12 and the inner tube 13 such that it is positioned behind the axis O1. The recovery passage 17 extends in the vertical direction, opens upward, and does not open downward. Specifically, the recovery passage 17 is a vertical groove formed on an inner circumferential surface of the small diameter portion 12*b* of the outer tube 12. The recovery passage 17 is provided throughout the overall length in the vertical direction in the small diameter portion 12*b*, and the lower end portion is closed from below by a bottom portion on a side behind the insertion portion 13*e* formed in the annular coupling portion 13*c* in the inner tube 13. However, a lower end portion of the recovery passage 17 communicates with a connection passage 18 (which will be described below) through communication paths 17*a* and communicates with the inside of the container body A through a communication opening 18*a*.

For example, the recovery passage 17 may be a vertical groove formed on an outer circumferential surface of the inner tube 13. Moreover, the recovery passage 17 may be formed by combining vertical grooves respectively formed in the outer tube 12 and the inner tube 13.

The communication paths 17*a* are passages through which the recovery passage 17 and the connection passage 18 (which will be described below) communicate with each other and are formed to extend in the circumferential direction of the vertical supply tube portion 10 from the recovery passage 17. The communication paths 17*a* extends forward from the lower end portion of the recovery passage 17 and are connected to the connection passage 18. For example, two communication paths 17*a* are formed in an arc shape and are provided with the axis O1 sandwiched therebetween in the radial direction.

The communication paths 17*a* are circumferential grooves extending downward from the small diameter portion 12*b* of the outer tube 12, formed on an inner circumferential surface of the insertion tube portion 12*d* having a smaller wall thickness than the small diameter portion 12*b* inserted into the insertion portion 13*e*, and extending in the circumferential direction. For example, the communication paths 17*a* may be circumferential grooves formed on an inner circumferential surface of the inner tube 13. Moreover, the communication paths 17*a* may be formed by combining circumferential grooves respectively formed in the outer tube 12 and the inner tube 13. The communication paths 17*a* communicate with the inside of the container body A through the communication opening 18*a* (which will be described below). In parts other than the communication opening 18*a*, the communication paths 17*a* do not open downward (inside the container body A) by the bottom portion of the insertion portion 13*e*.

The connection passage 18 extending in the vertical direction is formed between the inner circumferential surface of the outer tube 12 and the outer circumferential surface of the inner tube 13. The connection passage 18 is separated from the recovery passage 17 around the axis O1 and is positioned in front of the recovery passage 17 and the axis O1. Specifically, the connection passage 18 is disposed in a front end portion of the vertical supply tube portion 10. An upper end portion of the connection passage 18 is positioned behind the fitting tube portion 111. A lower end portion of the connection passage 18 communicates with the inside of the container body A through the communication opening 18*a* formed in the annular coupling portion 13*c* in the inner tube 13. Accordingly, the connection passage 18 allows the inside of the fitting tube portion 111 and the inside of the container body A to communicate with each other through the communication opening 18*a* and the inside of the large diameter portion 13*a*. The connection passage 18 functions as a residual pressure releasing passage for discharging air inside the main cylinder 82. Moreover, the recovery passage 17 described above communicates with the inside of the container body A through the communication paths 17*a*, the connection passage 18, and the communication opening 18*a*.

For example, the connection passage 18 may be formed by a vertical groove formed on the outer circumferential surface of the inner tube 13 or may be formed by combining vertical grooves respectively formed in the outer tube 12 and the inner tube 13.

An upper end portion of the recovery passage 17 communicates with the inside of the storage cylinder 40 (refer to FIG. 1). If the storage plunger 50 moves rearward to a certain extent, the inside of the storage space 40*a* communicates with the inside of the container body A through the recovery passage 17. Namely, when the storage plunger 50 moves rearward, the inside of the storage space 40*a* and the inside of the container body A can communicate with each other utilizing the recovery passage 17. Therefore, a part of a liquid inside the storage space 40*a* can return to the inside of the container body A so that excessive supply of a liquid to the inside of the storage space 40*a* can be curbed. Accordingly, excessive increase in pressure inside the storage space 40*a* can be curbed, and occurrence of liquid leakage, breakage of each portion, or the like can be curbed.

The mounting cap 30 includes the mounting portion 31 in which the vertical supply tube portion 10 is inserted into the inward side thereof and which is mounted in the mouth portion of the container body A, and a restriction portion 32 which is close to or abuts on the ejector main body 2 in the vertical direction and restricts relative displacement between the mounting cap 30 and the ejector main body 2. The mounting portion 31 is formed in a topped tubular shape in which a female screw is formed on an inner circumferential surface thereof. An upper end surface of the mounting portion 31 on an inner surface side faces the flange portion 13*d* in the vertical direction and sandwiches the flange portion 13*d* of the vertical supply tube portion 10 with the upper end opening edge in the mouth portion of the container body A in the vertical direction.

An outer surface side of the mounting portion 31 decreases in diameter as it goes upward in the upper end portion thereof. The restriction portion 32 is formed in a cylindrical shape extending upward from the part of the upper end portion of the mounting portion 31 decreasing in diameter. The restriction portion 32 surrounds, over the whole circumference, the outward side of the insertion portion 13*e* of the inner tube 13 into which the insertion tube portion 12*d* of the outer tube 12 is inserted in the vertical direction. Namely, the restriction portion 32 extends in the vertical direction such that the insertion portion 13*e* is included. An inner circumferential surface of the restriction portion 32 is close to an outer circumferential surface of the large diameter portion 12*a* of the outer tube 12. The inner circumferential surface of the restriction portion 32 may abut on the outer circumferential surface of the large diameter portion 12*a* of the outer tube 12.

An upper end portion 32*a* that is an upper end opening edge of the restriction portion 32 is positioned above the upper surface of the annular coupling portion 13*c* facing the main cylinder mounting tube portion 110 with a gap therebetween in the vertical direction. In addition, the upper end portion 32*a* of the restriction portion 32 is close to a lower portion of the main cylinder mounting tube portion 110 for mounting the main cylinder 82 on a side in front of the vertical supply tube portion 10. The upper end portion 32*a* of the restriction portion 32 may abut on the lower portion of the main cylinder mounting tube portion 110 for mounting the main cylinder 82. In addition, the upper end portion 32*a* of the restriction portion 32 is close to a lower surface 5*a* of the cover body 5 on a side behind the vertical supply tube portion 10. The upper end portion 32*a* of the restriction portion 32 may abut on the lower surface 5*a* of the cover body 5.

Here, the expression "the restriction portion 32 is close to the ejector main body 2 in the vertical direction" denotes that although the restriction portion 32 and the ejector main body 2 do not abut on each other, a gap formed between the restriction portion 32 and the ejector main body 2 is very small. For example, the expression "a gap is very small" preferably denotes a gap size in which an ejection angle of the ejection hole 4 falls within a range from a reference angle (for example, 0°) to a minute angle (for example, ±3° or smaller) when the vertical supply tube portion 10 of the ejector main body 2 tends to be bent to the container body A side with the mounting cap 30 as a fulcrum. Compared to the thickness of the restriction portion 32 from the outer circumferential surface to the inner circumferential surface, the gap size need only be equal to or smaller than the thickness of the restriction portion 32 and may be preferably equal to or smaller than ⅕ of the thickness of the restriction portion 32. The gap between the inner circumferential surface of the restriction portion 32 and the outer circumferential surface of the large diameter portion 12*a* of the outer tube 12 may also be equal to or smaller than the gap size. In a state where mounting in the container body A is completed, it is preferable that the mounting cap 30 be close to the ejector main body 2 with a very small gap therebetween. Since the mounting cap 30 is close to the ejector main body 2 with a very small gap therebetween, when the trigger-type liquid ejector 1 is attached and detached with respect to the container body A, the mounting cap 30 can turn without sliding on the ejector main body 2. Therefore, the trigger-type liquid ejector 1 is easily attached and detached with respect to the container body A.

(Operation of Trigger-Type Liquid Ejector)

Next, a case of using the trigger-type liquid ejector 1 constituted as described above will be described. A state where each portion inside the trigger-type liquid ejector 1 can be filled with a liquid and the liquid can be suctioned up into the vertical supply tube portion 10 through a plurality of times of operations of the trigger portion 81 shown in FIG. 1 is assumed.

After the stopper T is detached, if the trigger portion 81 is operated to be pulled rearward against a biasing force of the biasing member 84, the main piston 83 moves rearward from the forefront position and the inside of the main cylinder 82 is compressed. Accordingly, a liquid inside the main cylinder 82 is supplied to the vertical supply tube portion 10. A liquid supplied to the vertical supply tube portion 10 presses the ball valve 90 downward and pushes up the storage valve 91.

Accordingly, a liquid inside the vertical supply tube portion 10 can be supplied to the storage space 40*a* of the storage cylinder 40 through the inside of the connection tube portion 20 and the supply hole 41, and the storage space 40*a* can be compressed. For this reason, along with compression of the storage space 40*a*, the storage plunger 50 can be moved rearward from the most advanced position against a biasing force of the plunger biasing member 60, and a liquid can be stored in (fill) the storage space 40*a*. Since the storage plunger 50 moves rearward, a liquid in the storage space 40*a* at a high pressure can be led to the ejection hole 4 through the inside of the spouting tube portion 70. Accordingly, a liquid can be ejected forward through the ejection hole 4.

As described above, every time an operation of pulling the trigger portion 81 rearward is performed, a liquid can be ejected through the ejection hole 4, and a liquid can be stored inside the storage space 40*a* by moving the storage plunger 50 rearward.

Thereafter, if the trigger portion 81 is released, the trigger portion 81 makes forward restoration movement due to an elastic restoring force (biasing force) of the biasing member 84. Therefore, along with this, the main piston 83 coupled to the trigger portion 81 also makes forward restoration movement inside the main cylinder 82. For this reason, since the pressure inside the main cylinder 82 can be made lower than the pressure inside the container body A through decompression, the ball valve 90 can be raised in a state where the storage valve 91 remains closed. Therefore, a liquid inside the container body A can be suctioned up into the vertical supply tube portion 10 and can be introduced into the main cylinder 82. Accordingly, it is possible to prepare for a next ejection.

If a rearward operation of the trigger portion 81 is stopped, although supply of a liquid to the storage space 40*a* through the inside of the vertical supply tube portion 10 and the inside of the connection tube portion 20 stops, the storage plunger 50 starts to move forward toward the most advanced position due to a biasing force of the plunger biasing member 60. At this time, outflow of a liquid from the storage space 40*a* to the inside of the vertical supply tube portion 10 is restricted by the storage valve 91.

Accordingly, a liquid stored in the storage space 40*a* can be led to the ejection hole 4 through the inside of the spouting tube portion 70, and a liquid can be continuously ejected forward through the ejection hole 4. In this manner, not only when performing an operation of pulling the trigger portion 81 rearward, even when the trigger portion 81 is not being operated, a liquid can be ejected and a liquid can be continuously ejected.

As described above, according to the trigger-type liquid ejector 1 of the present embodiment, not only when performing an operation of pulling the trigger portion 81 rearward, even when the trigger portion 81 is not being operated, a liquid can be ejected and a liquid can be continuously ejected. In the trigger portion 81, since the upper end portion (fulcrum) is pivotally supported by the nozzle member 3 in a rockable manner and the main piston 83 is coupled to an intermediate portion (point of action) of the trigger portion 81, for example, the main piston 83 can be efficiently moved utilizing the principle of the lever by operating the lower end portion (point of force) of the trigger portion 81. For this reason, operability of the trigger portion 81 can be improved.

Moreover, according to the trigger-type liquid ejector 1 of the present embodiment, as shown in FIG. 2, the ejector main body 2 is mounted in the mouth portion of the container body A by the mounting cap 30. Particularly, the mounting cap 30 is provided with the restriction portion 32 which is close to or abuts on the ejector main body 2 in the vertical direction. Therefore, for instance, even if the ejector main body 2 tends to be deformed close to the container body A side while the ejector main body 2 uses the mounting cap 30 as a fulcrum, for example, when the ejector main body 2 falls in a manner of facing downward or the like, since the upper end portion 32*a* of the restriction portion 32 abuts on the lower portion of the main cylinder mounting tube portion 110 and the lower surface 5*a* of the cover body 5, deformation thereof can be restricted. Accordingly, it is possible to provide a durable trigger-type liquid ejector 1 against a fall and the like.

In this manner, the trigger-type liquid ejector 1 according to the present embodiment includes the nozzle member 3 in which the ejection hole 4 for ejecting a liquid is formed, the ejector main body 2 in which the nozzle member 3 is mounted, and the mounting cap 30 which mounts the ejector main body 2 in the mouth portion of the container body A accommodating a liquid. The ejector main body 2 includes the vertical supply tube portion 10 which suctions up a liquid inside the container body A, and the trigger mechanism 80 which has the trigger portion 81 provided so as to be movable rearward in a forward biased state and causes a liquid to flow from the inside of the vertical supply tube portion 10 toward the ejection hole 4 side in response to rearward movement of the trigger portion 81. The mounting cap 30 includes the restriction portion 32 which is close to or abuts on the ejector main body 2 in the vertical direction and restricts relative displacement between the mounting cap 30 and the ejector main body 2. According to this constitution, deformation of the ejector main body 2 having the trigger mechanism 80 can be curbed.

In addition, in the present embodiment, the vertical supply tube portion 10 includes the inner tube 13, and the outer tube 12 which is externally fitted to the inner tube 13. The inner tube 13 is provided with the insertion portion 13*e* into which a part of the outer tube 12 (insertion tube portion 12*d*) is inserted in the vertical direction. The restriction portion 32 is formed in a tubular shape surrounding the outward side of the insertion portion 13*e*. According to this constitution, since the parts of the inner tube 13 and the outer tube 12 fitted to each other due to insertion in the vertical direction are protected by the tubular restriction portion 32 over the whole circumference from the outward side, a bending force or a load applied to the insertion tube portion 12*d* having a small wall thickness inserted into the insertion portion 13*e* can be reduced, and breakage or disconnection can be curbed.

In addition, in the present embodiment, the trigger mechanism 80 includes the main cylinder 82 which communicates with the vertical supply tube portion 10 and opens forward, and the main piston 83 which has the sliding portion 85 capable of sliding on the inner circumferential surface of the main cylinder 82 and moves in the forward-rearward direction with respect to the main cylinder 82 along with movement of the trigger portion 81 in the forward-rearward direction. The ejector main body 2 includes the main cylinder mounting tube portion 110 which protrudes forward from the vertical supply tube portion 10 and in which the main cylinder 82 is mounted. The mounting cap 30 includes the mounting portion 31 in which the vertical supply tube portion 10 is inserted into the inward side thereof and which is mounted in the mouth portion of the container body A. The restriction portion 32 extends upward from the mounting portion 31, is close to or abuts on the lower portion of the main cylinder mounting tube portion 110, and restricts relative displacement between the mounting cap 30 and the ejector main body 2. According to this constitution, since the restriction portion 32 is close to or abuts on the lower portion of the main cylinder mounting tube portion 110 in the vertical direction, which is a strength member for mounting the main cylinder 82, a load applied from the restriction portion 32 when deformation of the ejector main body 2 is restricted can be sufficiently received on the ejector main body 2 side.

In addition, in the present embodiment, the ejector main body 2 includes the storage cylinder 40 into which a liquid that has passed through the inside of the vertical supply tube portion 10 is supplied in response to rearward movement of the trigger portion 81, and the storage plunger 50 which is provided inside the storage cylinder 40 so as to be movable in the axial direction along the center axis of the storage cylinder 40, moves toward one side in the axial direction along with supply of a liquid to the inside of the storage cylinder 40, and is biased toward the other side. According to this constitution, the inside of the storage cylinder 40 can be compressed by supplying a liquid from the inside of the vertical supply tube portion 10 to the inside of the storage cylinder 40. Therefore, the storage plunger 50 can be pressurized toward one side in the axial direction against a biasing force toward the other side in the axial direction so that the storage plunger 50 can be moved toward one side in the axial direction while a liquid is ejected. For this reason, every time an operation of pulling the trigger portion 81 is performed, while a liquid is stored inside (fills) the storage cylinder 40, a liquid can be ejected by moving the storage plunger 50 to one side in the axial direction. If the operation of the trigger portion 81 is stopped after the inside of the storage cylinder 40 is filled with a liquid, supply of a liquid to the inside of the storage cylinder 40 through the inside of the vertical supply tube portion 10 stops. However, the storage plunger 50 starts restoration movement toward the other side in the axial direction. Accordingly, a liquid filling the inside of the storage cylinder 40 can be pushed out toward the ejection hole 4 side from the inside of the storage cylinder 40 and can be ejected through the ejection hole 4. Therefore, a liquid can be continuously ejected.

When a liquid is continuously ejected in this manner, the ejector main body 2 becomes heavier. However, even in such a case, the restriction portion 32 makes it possible to provide a durable trigger-type liquid ejector 1 against a fall and the like.

In addition, in the present embodiment, as shown in FIG. 1, the rear end of the storage cylinder 40 protrudes rearward beyond the rear end of the mounting cap 30, and the front end of the storage cylinder 40 is positioned in front of the axis O1. In such a trigger-type liquid ejector 1 having the storage cylinder 40 and capable of performing continuous ejection, in order to maintain balance with the storage cylinder 40 protruding rearward and secure fitting sizes of the nozzle member 3 and the spouting tube portion 70, a front end of the nozzle member 3 is formed to be positioned in front of that in an ordinary trigger-type liquid ejector. For this reason, when an impact is applied to a rear end portion of the storage cylinder 40 protruding rearward or a front end portion of the nozzle member 3 protruding forward due to a fall or the like, a stronger moment of force is generated in the fitting location between the vertical supply tube portion 10 and the mouth portion of the container body A. For this reason, according to the trigger-type liquid ejector 1 of a continuous ejection type, it is more effective in curbing deformation of the ejector main body 2 using the restriction portion 32 described above than ordinary trigger-type liquid ejectors.

Second Embodiment

Next, a second embodiment of the present invention will be described. In the following description, the same reference signs are applied to constituents which are the same as or equivalent to those in the first embodiment described above, and description thereof will be simplified or omitted.

Figure 3:
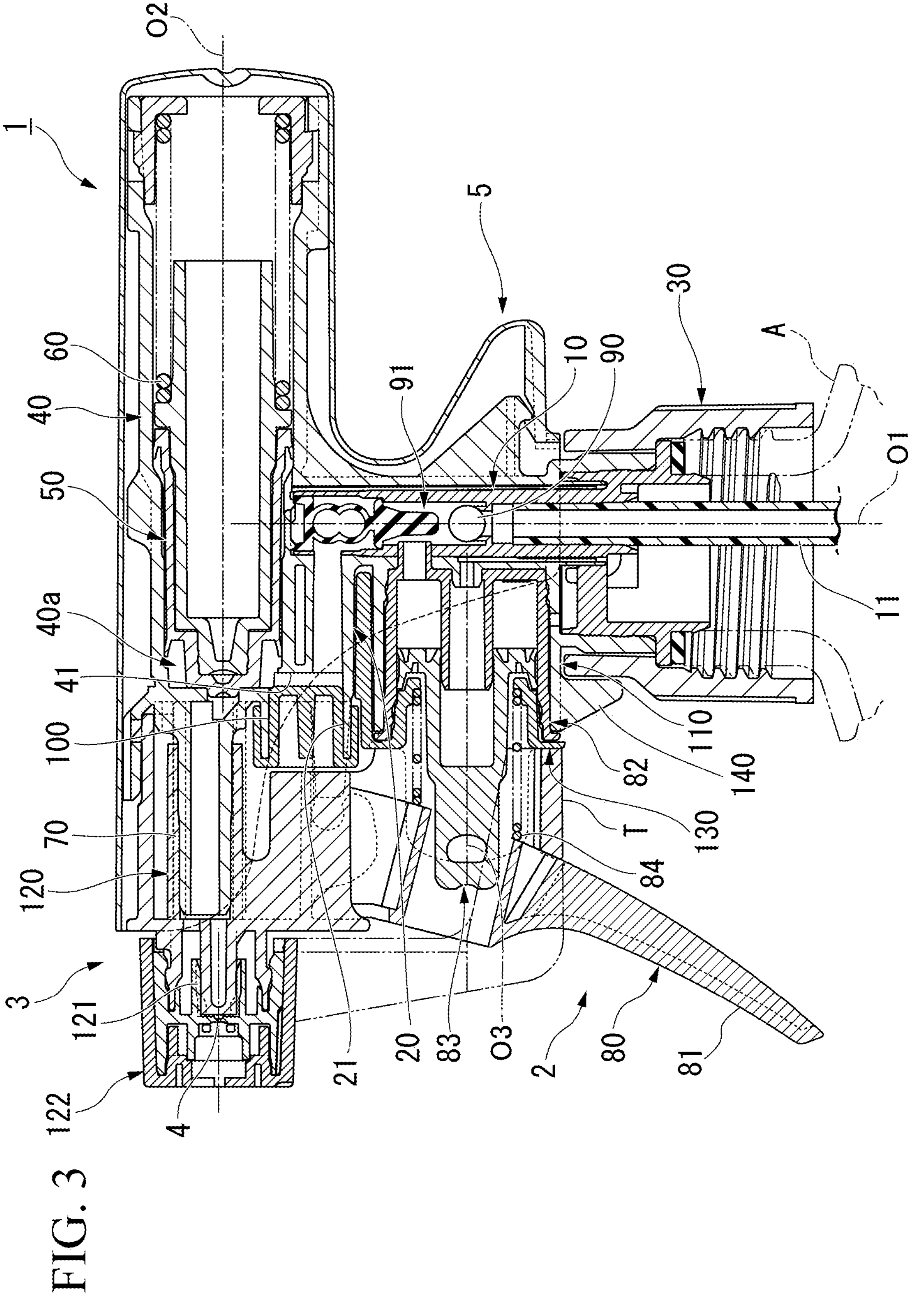
FIG. 3 is a longitudinal sectional view of the trigger-type liquid ejector according to a second embodiment of the present invention.

As shown in FIG. 3, the trigger-type liquid ejector 1 according to the second embodiment includes a second restriction portion 140 which extends downward from the lower portion of the main cylinder mounting tube portion 110, is close to or abuts on the front side of the mounting cap 30, and restricts relative displacement between the mounting cap 30 and the ejector main body 2.

The second restriction portion 140 is a rib which is formed integrally with the main cylinder mounting tube portion 110 and has substantially a right-angled triangle shape in a side view. An inclined surface side of the second restriction portion 140 faces forward, and a perpendicular surface side of the second restriction portion 140 faces rearward. Namely, the perpendicular surface side of the second restriction portion 140 faces the mounting cap 30 in the forward-rearward direction and is close to the front side of the mounting cap 30. The gap size between the second restriction portion 140 and the mounting cap 30 in the forward-rearward direction may be the same as the gap size between the restriction portion 32 and the ejector main body 2 in the vertical direction shown in FIG. 2 described above or may be larger than the gap size. The second restriction portion 140 may abut on the mounting cap 30.

According to the second embodiment having the foregoing constitution, the second restriction portion 140 which extends downward from the lower portion of the main cylinder mounting tube portion 110, is close to or abuts on the front side of the mounting cap 30, and restricts relative displacement between the mounting cap 30 and the ejector main body 2 is provided. According to this constitution, even if a greater load is applied to the ejector main body 2 and the ejector main body 2 tends to be deformed close to the container body A side from a state of being restricted by the restriction portion 32 shown in FIG. 2 described above, since the second restriction portion 140 will abut on the front side of the mounting cap 30, deformation thereof can be restricted. In addition, in a state where mounting in the container body A is completed, it is preferable that the mounting cap 30 be close to the second restriction portion 140 with a very small gap therebetween in the forward-rearward direction. since the mounting cap 30 is close to the second restriction portion 140 with a very small gap therebetween in the forward-rearward direction, when the trigger-type liquid ejector 1 is attached and detached with respect to the container body A, the mounting cap 30 can turn without sliding on the ejector main body 2. The position where the second restriction portion 140 is close to or abuts on the mounting cap 30 may be in front of the mounting portion 31 shown in FIG. 2 or may be in front of the restriction portion 32. However, in consideration of easiness of turning the mounting cap 30, it is better to be in front of the restriction portion 32 than the mounting portion 31.

Hereinabove, embodiments of the present invention have been described, but these embodiments are presented as examples and are not intended to limit the scope of the invention. The embodiments can be performed in various other forms, and various omissions, replacements, and changes can be made within a range not departing from the gist of the invention. For example, the embodiments and modification examples thereof include those that can be easily conceived by those who skilled in the art, those that are substantially the same, those within an equivalent range, and the like.

For example, in the foregoing embodiments, a case where the restriction portion 32 has a tubular shape has been described as an example, but the restriction portion 32 may be a projection projecting at one location or a plurality of locations in the circumferential direction in the upper end portion of the mounting portion 31.

In addition, for example, in the foregoing embodiments, a case where the restriction portion 32 is close to or abuts on the main cylinder mounting tube portion 110 or the cover body 5 has been described as an example, but the restriction portion 32 may be close to or abut on only one of the main cylinder mounting tube portion 110 and the cover body 5. In addition, the restriction portion 32 may abut on or be close to a place other than the main cylinder mounting tube portion 110 and the cover body 5 as long as relative displacement between the ejector main body 2 and the mounting cap 30 can be restricted.

Furthermore, within a range not departing from the gist of the present invention, the constituent elements according to the foregoing embodiments can be suitably replaced with known constituent elements.

Third Embodiment

Hereinafter, an embodiment of a trigger-type liquid ejector according to a third embodiment of the present invention will be described with reference to the drawings. In the present embodiment, an ejection container in which a trigger-type liquid ejector is attached to a container body will be described as an example.

Figure 4:
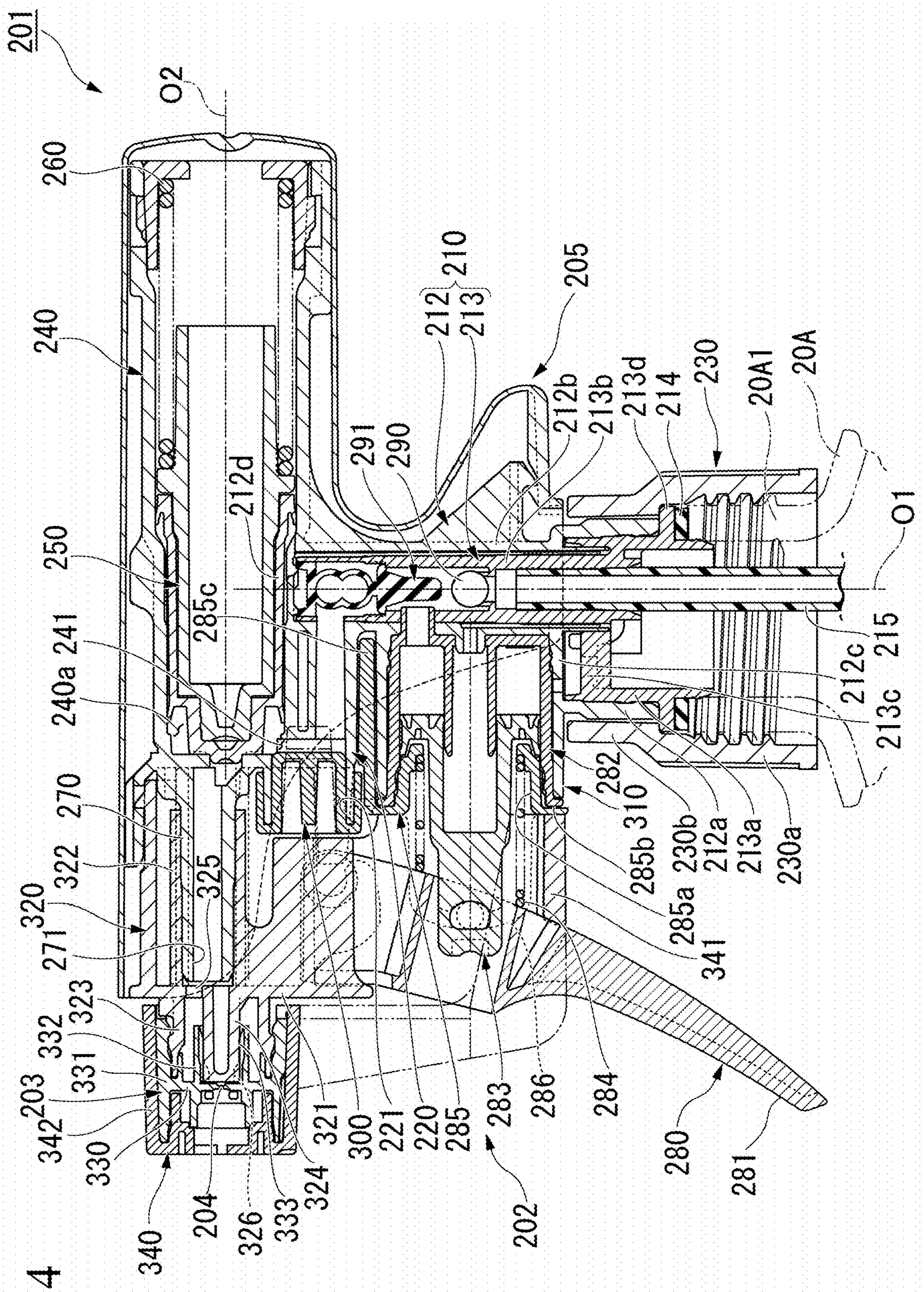
FIG. 4 is a longitudinal sectional view showing a trigger-type liquid ejector according to a third embodiment of the present invention.
Figure 5:
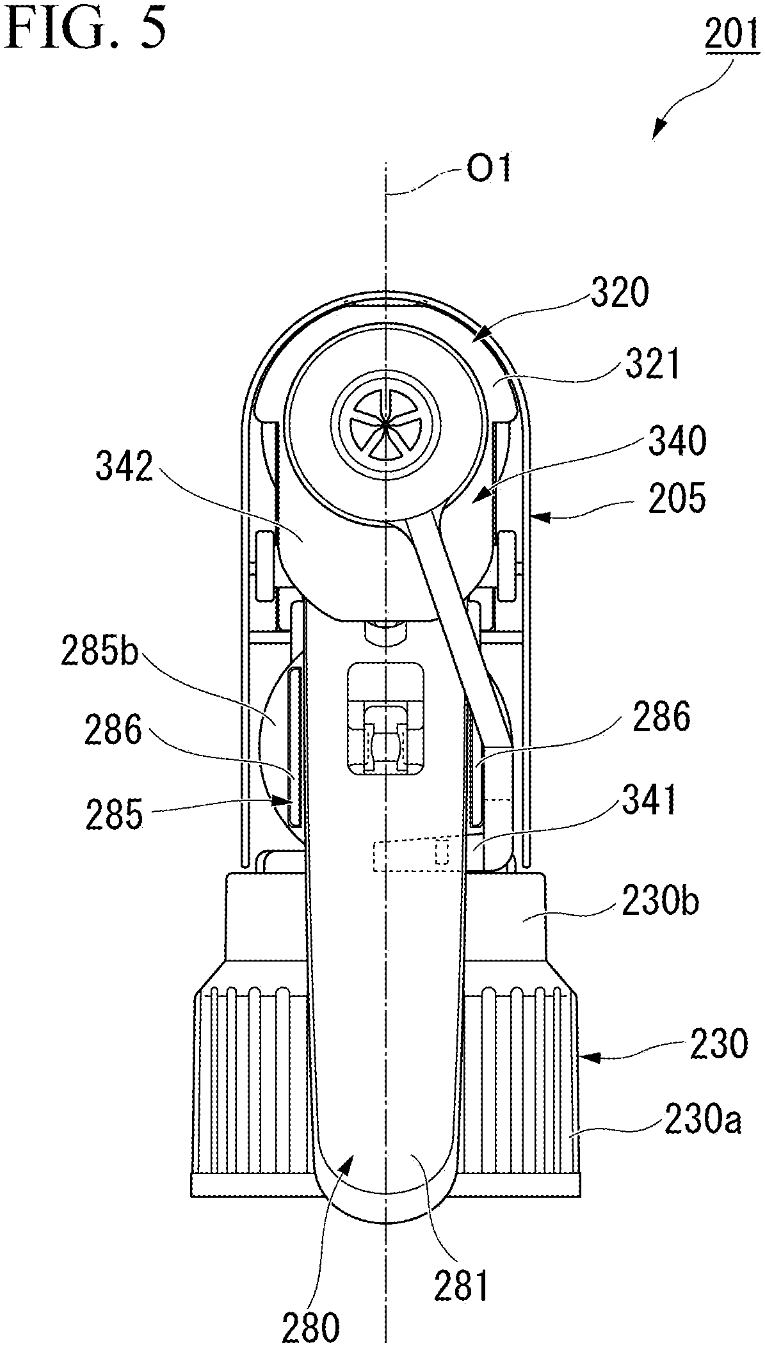
FIG. 5 is a front view of the trigger-type liquid ejector shown in FIG. 4 viewed from the front.

As shown in FIGS. 4 and 5, a trigger-type liquid ejector 201 of the present embodiment includes an ejector main body 202 which is mounted in a container body 20A accommodating a liquid, a nozzle member 203 in which an ejection hole 204 for ejecting a liquid is formed and which is mounted in the ejector main body 202, and the cover body 5 which covers the ejector main body 202 and the nozzle member 203. Unless otherwise specified, each of the constituent components of the trigger-type liquid ejector 201 is a molded article made of a synthetic resin.

(Ejector Main Body)

The ejector main body 202 mainly includes a vertical supply tube portion (the vertical supply tube portion according to the present invention) 210, a connection tube portion 220, a mounting cap 230, a storage cylinder 240, a storage plunger 250, a biasing member 260, a spouting tube portion 270, a trigger mechanism 280, a ball valve 290, and a storage valve 291.

In the present embodiment, a center axis of the vertical supply tube portion 210 will be referred to as the axis O1, the container body 20A side along this axis O1 will be referred to as the lower side, a side opposite thereto will be referred to as the upper side, and a direction along the axis O1 will be referred to as the vertical direction. In addition, in a plan view in the vertical direction, one direction intersecting the axis O1 will be referred to as the forward-rearward direction, and a direction bidirectionally orthogonal to the vertical direction and the forward-rearward direction will be referred to as the lateral direction.

Moreover, in the present embodiment, a center axis of the storage cylinder 240 will be referred to as the axis O2. In the present embodiment, the axis O2 extends in the forward-rearward direction. Therefore, in the present embodiment the forward-rearward direction corresponds to the axial direction along the center axis of the storage cylinder 240. In the present embodiment, the rear side corresponds to one side in the axial direction along the center axis of the storage cylinder 240, and the front side corresponds to the other side in the axial direction along the center axis of the storage cylinder 240. However, the axial direction along the axis O2 may not coincide with the forward-rearward direction.

The vertical supply tube portion 210 has a function of suctioning up a liquid inside the container body 20A extending in the vertical direction. The vertical supply tube portion 210 is mounted in the container body 20A by the mounting cap 230. The vertical supply tube portion 210 includes an outer tube 212 having a topped tubular shape, and an inner tube 213 which is fitted into the outer tube 212. The axis O1 of the vertical supply tube portion 210 is positioned behind the container axis of the container body 20A.

The outer tube 212 includes a large diameter portion 212*a*, a small diameter portion 212*b* which is disposed above the large diameter portion 212*a* and has a smaller diameter than the large diameter portion 212*a*, and an annular coupling portion 212*c* which couples an upper end portion of the large diameter portion 212*a* and a lower end portion of the small diameter portion 212*b*. The small diameter portion 212*b* is formed in a cylindrical shape with a top and is provided coaxially with the axis O1. A top wall portion 212*d* of the small diameter portion 212*b* is formed integrally with the storage cylinder 240.

The inner tube 213 includes a large diameter portion 213*a*, a small diameter portion 213*b* which is disposed above the large diameter portion 213*a* and has a smaller diameter than the large diameter portion 213*a*, and an annular coupling portion 213*c* which couples an upper end portion of the large diameter portion 213*a* and a lower side part of the small diameter portion 213*b*. The large diameter portion 213*a* is provided inside the large diameter portion 212*a* of the outer tube 212. In the large diameter portion 213*a*, an annular flange portion 213*d* protruding toward the outward side in the radial direction is formed in a part protruding downward from the large diameter portion 212*a* of the outer tube 212. The flange portion 213*d* is disposed on an upper end opening edge in a mouth portion 20A1 of the container body 20A via a gasket 214. The flange portion 213*d* is sandwiched in the vertical direction between the mounting cap 230 which is mounted in the mouth portion 20A1 of the container body 20A by screwing, for example, and an upper end opening edge of the mouth portion 20A1. Accordingly, the entire ejector main body 202 is mounted in the mouth portion 20A1 of the container body 20A via the mounting cap 230.

The small diameter portion 213*b* is formed in a cylindrical shape and is provided coaxially with the axis O1. The small diameter portion 213*b* opens on both sides in the vertical direction and is provided inside the small diameter portion 212*b* of the outer tube 212. An upper end opening edge of the small diameter portion 213*b* is slightly separated downward from the top wall portion 212*d* of the outer tube 212. An upper end portion of a pipe 215 extending in the vertical direction is fitted to the inward side of the lower side part of the small diameter portion 213*b*. A lower end opening portion of the pipe 215 is positioned in a bottom portion (not shown) of the container body 20A.

The mounting cap 230 includes a lower cap 230*a* which surrounds the mouth portion 20A1 of the container body 20A and the flange portion 213*d* from the outward side, and an upper cap 230*b* which is disposed above the lower cap 230*a* and has a smaller diameter than the lower cap 230*a*. Accordingly, the mounting cap 230 is formed in a multi-stage tubular shape having outer diameters changing in two stages. Particularly, the upper cap 230*b* is disposed such that the large diameter portion 213*a* of the inner tube 213 and the large diameter portion 212*a* of the outer tube 12, which are disposed in double layers, are surrounded from the outward side. Accordingly, the upper cap 230*b* surrounds and protects the large diameter portion 213*a* and the large diameter portion 212*a* and prevents an external force from directly acting on the large diameter portion 213*a* and the large diameter portion 212*a*, for example. The upper cap 230*b* is disposed such that an upper end opening edge of the upper cap 230*b* is close to or abuts on the annular coupling portion 212*c* in the outer tube 212 from below.

An upper end portion of the vertical supply tube portion 210 is provided with the connection tube portion 220 which extends forward. The connection tube portion 220 is formed in a tubular shape having an opening portion 221 which opens forward in the ejector main body 202 and communicates with the inside of the vertical supply tube portion 210. A closing plug 300 is mounted in the opening portion 221 of the connection tube portion 220 and closes (seals) the opening portion 221. The closing plug 300 will be described below in detail.

A cylinder tube portion 310 is provided below the connection tube portion 220 and above the mounting cap 230. The cylinder tube portion 310 protrudes forward from the vertical supply tube portion 210 and opens forward. Apart of the cylinder tube portion 310 is formed integrally with the outer tube 212 in the vertical supply tube portion 210. A main cylinder 282 is fitted into the cylinder tube portion 310. The main cylinder 282 is formed in a bottomed tubular shape opening forward and having a closed rear side. The inside of the main cylinder 282 communicates with the inside of the vertical supply tube portion 210.

The storage cylinder 240 is disposed above the vertical supply tube portion 210 and the connection tube portion 220. The storage cylinder 240 extends in the forward-rearward direction and is disposed in a manner of straddling the vertical supply tube portion 210 in the forward-rearward direction. In the illustrated example, the storage cylinder 240 is disposed substantially parallel to the connection tube portion 220 and the cylinder tube portion 310. Moreover, the lower end portion of the storage cylinder 240 is formed integrally with the upper end portion of the vertical supply tube portion 210 and an upper end portion of the connection tube portion 220.

A liquid that has passed through the inside of the vertical supply tube portion 210 and the inside of the connection tube portion 220 is supplied to the inside of the storage cylinder 240 (a storage space 240*a* which will be described below) in response to rearward rocking of a trigger portion 281. Specifically, the supply hole 241 communicating with the inside of the connection tube portion 220 is formed in a lower side part of a front end portion in the storage cylinder 240. The supply hole 241 opens in a part positioned behind a plug main body 301 in the closing plug 300, which will be described below. Moreover, the supply hole 241 opens in a direction intersecting the axis O2 in the lower side part of the front end portion in the storage cylinder 240. Accordingly, a liquid that has passed through the inside of the vertical supply tube portion 210 and the inside of the connection tube portion 220 can be supplied to the inside of the storage cylinder 240 through the supply hole 241.

The storage plunger 250 is disposed inside the storage cylinder 240 so as to be movable in the forward-rearward direction along the axis O2. Accordingly, the storage plunger 250 tightly slides in the forward-rearward direction inside the storage cylinder 240. The storage plunger 250 moves rearward along with supply of a liquid to the inside of the storage cylinder 240. The storage plunger 250 cuts off communication between the inside of the vertical supply tube portion 210 and the ejection hole 204 through the inside of the connection tube portion 220 and allows communication between the inside of the vertical supply tube portion 210 and the ejection hole 204 through the inside of the connection tube portion 220 when it has moved rearward.

Namely, the storage plunger 250 cuts off communication between the inside of the vertical supply tube portion 210 and the ejection hole 204 (inside of the spouting tube portion 270) through the inside of the connection tube portion 220 at the forefront position and allows communication between the inside of the vertical supply tube portion 210 and the ejection hole 204 (inside of the spouting tube portion 270) through the inside of the connection tube portion 220 when it has moved rearward from the forefront position. In the storage cylinder 240, the space positioned in front of the storage plunger 250 functions as the storage space 240*a*.

The storage space 240*a* stores a liquid that has passed through the inside of the vertical supply tube portion 210 and the inside of the connection tube portion 220 and has passed through the supply hole 241. The storage space 240*a* expands when the storage plunger 250 moves rearward in response to supply of a liquid. The storage space 240*a* can also communicate with the inside of the spouting tube portion 270.

The biasing member 260 biases the storage plunger 250 forward. The biasing member 260 is disposed behind the storage plunger 250 inside the storage cylinder 240. The biasing member 260 biases the storage plunger 250 forward in an initial state before the trigger portion 281 is operated. Accordingly, the storage plunger 250 is positioned at the forefront position. The biasing member 260 is a metal coil spring provided coaxially with the axis O2. However, for example, a resin spring may be used or other elastic members may also be used as the biasing member 260.

In the storage cylinder 240 and the storage plunger 250 constituted as described above, a liquid inside the storage space 240*a* can be compressed until the storage plunger 250 moves rearward. Thereafter, if the liquid pressure in the storage space 240*a* reaches a predetermined value, the storage plunger 250 moves rearward against the biasing member 260. Accordingly, a liquid in the storage space 240*a* can be supplied to the ejection hole 204 side.

The spouting tube portion 270 extends forward from the storage cylinder 240. The spouting tube portion 270 communicates with the inside of the vertical supply tube portion 210 through the inside of the storage cylinder 240 (storage space 240*a*) and the inside of the connection tube portion 220. Accordingly, the spouting tube portion 270 can lead a liquid that has passed through the inside of the vertical supply tube portion 210, the inside of the connection tube portion 220, and the inside of the storage cylinder 240 (storage space 240*a*) to the ejection hole 204.

The trigger mechanism 280 includes the trigger portion 281, the main cylinder 282, a main piston 283, a coil spring 284, and a receiving member 285. The trigger mechanism 280 can cause a liquid to flow from the inside of the vertical supply tube portion 210 toward the ejection hole 204 side through the inside of the connection tube portion 220 in response to rearward rocking of the trigger portion 281.

The trigger portion 281 is disposed in front of the vertical supply tube portion 210 so as to be movable rearward in a forward biased state. The trigger portion 281 is formed to extend in the vertical direction and is disposed below the spouting tube portion 270. In the trigger portion 281, an upper end portion is pivotally supported by a relay member 320 (which will be described below) so as to be rockable in the forward-rearward direction, and a lower end portion is disposed in front of the main cylinder 282.

The main piston 283 is disposed inside the main cylinder 282 so as to be movable in the forward-rearward direction. The main piston 283 can move in the forward-rearward direction in association with rocking of the trigger portion 281. Accordingly, the inside of the main cylinder 282 is compressed and decompressed along with movement of the main piston 283 in the forward-rearward direction. The main piston 283 is formed in a topped tubular shape opening rearward and having a closed front side.

The receiving member 285 includes a receiving tube 285*a* which is fitted to the inward side of the main cylinder 282 from the front, an annular flange portion 285*b* which protrudes toward the outward side of the main cylinder 282 in the radial direction from a front end portion of the receiving tube 285*a*, and a coupling piece 285*c* which extends rearward from the flange portion 285*b* and is inserted between the connection tube portion 220 and the main cylinder 282 from the front. The receiving tube 285*a* is positioned in front of the main piston 283. Therefore, the main piston 283 can move in the forward-rearward direction within a region behind the receiving tube 285*a* inside the main cylinder 282. The coupling piece 285*c* is fitted between the connection tube portion 220 and the main cylinder 282. Accordingly, the entire receiving member 285 is assembled integrally with the main cylinder 282.

A pair of guide plates 286 are formed in the flange portion 285*b* in a manner of facing each other in the lateral direction with the trigger portion 281 sandwiched therebetween. The guide plates 286 are formed to protrude forward from the flange portion 285*b*. The guide plates 286 are formed to be positioned on both left and right sides of the trigger portion 281 when the trigger portion 281 is positioned at the forefront rocking position. Accordingly, the trigger portion 281 can be moved rearward while being guided by the pair of guide plates 286. Therefore, the trigger portion 281 can be smoothly moved rearward while rattling or the like in the lateral direction is curbed.

For example, the coil spring 284 is made of a metal. The coil spring 284 is disposed in a manner of surrounding the main piston 283 from the outward side and is disposed in front of the receiving tube 285*a* in the receiving member 285. The coil spring 284 is disposed in a compressed state such that a rear end portion comes into contact with the receiving tube 285*a* and a front end portion comes into contact with the trigger portion 281. Accordingly, the coil spring 284 biases the trigger portion 281 and the main piston 283 forward.

Particularly, since the coil spring 284 is disposed in a manner of surrounding the main piston 283 from the outward side, it is disposed on the outward side of the main cylinder 282. Therefore, a liquid inside the main cylinder 282 and the coil spring 284 can be prevented from coming into contact with each other. For this reason, the material or the like of the coil spring 284 can be selected from a wide range regardless of the kind or the like of a liquid, and spring characteristics of the coil spring 284 can be easily maintained for a long period of time. Therefore, the material of the coil spring 284 is not limited to a metal, and a resin spring or the like may also be employed, for example. Since the coil spring 284 is disposed on the inward side of the pair of guide plates 286, it is concealed by the guide plates 286. For this reason, a situation where the coil spring 284 is directly visually recognized from the outside can be curbed, and designability or the like can be improved.

As described above, the main piston 283 is biased forward together with the trigger portion 281 due to a biasing force of the coil spring 284. The main piston 283 moves rearward along with rearward rocking of the trigger portion 281 and is inserted into the main cylinder 282. When the trigger portion 281 is at the forefront rocking position, the main piston 283 is positioned at the forefront position in a manner corresponding thereto.

The ball valve 290 and the storage valve 291 are provided inside the vertical supply tube portion 210. The ball valve 290 serves as a check valve cutting off communication between the inside of the container body 20A and the inside of the main cylinder 282 through the inside of the vertical supply tube portion 210 when the inside of the main cylinder 282 is compressed, and allowing communication between the inside of the container body 20A and the inside of the main cylinder 282 through the inside of the vertical supply tube portion 210 by being displaced upward when the inside of the main cylinder 282 is decompressed.

The storage valve 291 is disposed above the ball valve 290. The storage valve 291 serves as a check valve allowing supply of a liquid to the inside of the storage cylinder 240 from the inside of the vertical supply tube portion 210 through the inside of the connection tube portion 220 and restricting outflow of a liquid to the inside of the vertical supply tube portion 210 from the inside of the storage cylinder 240 through the inside of the connection tube portion 220.

A cover body 205 is formed to cover the entire vertical supply tube portion 210 except for the lower end portion, the entire spouting tube portion 270, and the entire storage cylinder 240 at least from both sides in the lateral direction and from above.

(Relay Member)

Moreover, the relay member 320 connecting the spouting tube portion 270 and the nozzle member 203 to each other is mounted in the spouting tube portion 270 constituted as described above. The relay member 320 is mounted in the spouting tube portion 270 from the front. The relay member 320 includes a facing wall portion 321 which is positioned on a side in front of a spouting opening portion 271 of the spouting tube portion 270 and is disposed in a manner of facing the spouting opening portion 271, a first relay tube portion 322 which extends rearward from the facing wall portion 321 and is externally fitted to the spouting tube portion 270, a second relay tube portion 323 which extends forward from the facing wall portion 321, and a guide shaft 324 which is positioned on the inward side of the second relay tube portion 323 and extends forward from the facing wall portion 321.

In the facing wall portion 321, a communication hole 325 communicating with the spouting opening portion 271 of the spouting tube portion 270 is formed in a part positioned above the guide shaft 324 and positioned on the inward side of the second relay tube portion 323. Accordingly, the inside of the second relay tube portion 323 communicates with the inside of the spouting tube portion 270 through the communication hole 325. A first switching grooves 326 extending in the forward-rearward direction is formed on an outer circumferential surface of the guide shaft 324. A plurality of first switching grooves 326 are formed with an interval therebetween around an axis of the guide shaft 324.

(Nozzle Member)

The nozzle member 203 is mounted in the second relay tube portion 323. Accordingly, the nozzle member 203 is mounted in the ejector main body 202 via the relay member 320. The nozzle member 203 includes a nozzle wall portion 330 which is provided in front of the facing wall portion 321 of the relay member 320 and in which the ejection hole 204 is formed, and an external fitting tube portion 331 which extends rearward from the nozzle wall portion 330 and is externally fitted to the second relay tube portion 323 from the front. The inside of the second relay tube portion 323 can communicate with the inside of the spouting tube portion 270 through the communication hole 325. The external fitting tube portion 331 is rotatably mounted in the second relay tube portion 323 in a state of being prevented from coming off forward. Accordingly, the nozzle member 203 is rotatably assembled to the relay member 320 around the axis of the guide shaft 324.

Moreover, in the nozzle wall portion 330, an inner tube portion 332 which is rotatably externally fitted to the guide shaft 324 projects rearward in a part positioned on the inward side of the external fitting tube portion 331. A second switching groove 333 extending in the forward-rearward direction is formed on an inner circumferential surface of the inner tube portion 332.

The first switching grooves 326 formed in the guide shaft 324 and the second switching groove 333 formed in the inner tube portion 332 communicate with each other at a predetermined rotation position in the nozzle member 203 about the axis of the guide shaft 324 and are in a non-communication state at other rotation positions. Since the first switching grooves 326 and the second switching groove 333 communicate with each other, the ejection hole 204 and the inside of the second relay tube portion 323 communicate with each other through the first switching grooves 326 and the second switching groove 333. Therefore, the nozzle member 203 can switch between an ejection allowing state allowing ejection of a liquid through the ejection hole 204 and an ejection restricting state restricting ejection along with rotation around the axis of the guide shaft 324.

(Stopper Member)

A stopper member 340 equipped with a stopper 341 for restricting rearward rocking of the trigger portion 281 is mounted in the nozzle member 203 constituted as described above. The stopper member 340 includes a stopper tube 342 which is mounted in the external fitting tube portion 331 of the nozzle member 203, and the lever-shaped stopper 341 which is formed to extend downward from the stopper tube 342. The stopper 341 is formed to wrap around in the lateral direction from a side in front of the trigger portion 281, and a part thereof can enter a gap between the receiving member 285 and the trigger portion 281 in the lateral direction. Accordingly, the stopper 341 restricts rearward rocking of the trigger portion 281.

The stopper 341 can be removed from the gap between the receiving member 285 and the trigger portion 281 by rotating the stopper member 340 together with the nozzle member 203. Accordingly, restriction of rearward rocking of the trigger portion 281 is canceled. Moreover, when the stopper 341 is removed by rotating the nozzle member 203 and the stopper member 340, the first switching grooves 326 and the second switching groove 333 communicate with each other, and the ejection state switches to the ejection allowing state allowing ejection of a liquid through the ejection hole 204.

(Closing Plug)

In the trigger-type liquid ejector 201 constituted as above, the closing plug 300 is mounted in the opening portion 221 of the connection tube portion 220 as described above. The relationship between the connection tube portion 220 and the closing plug 300 will be described in detail.

As shown in FIGS. 4 and 6 to 8, the connection tube portion 220 is formed integrally with the lower end portion positioned on the front end portion side of the storage cylinder 240. In the illustrated example, the connection tube portion 220 is formed integrally with a front wall portion 242 constituting the storage cylinder 240 and is formed to protrude forward beyond the front wall portion 242. In the connection tube portion 220, the inward side of a part protruding forward beyond the front wall portion 242 serves as the opening portion 221.

In the present embodiment, a center axis of the opening portion 221 extending in the forward-rearward direction will be referred to as an axis O4. Moreover, in a plan view in a direction of the axis O4, a direction intersecting the axis O4 will be referred to as the radial direction, and a direction surrounding the axis O4 will be referred to as the circumferential direction.

Figure 6:
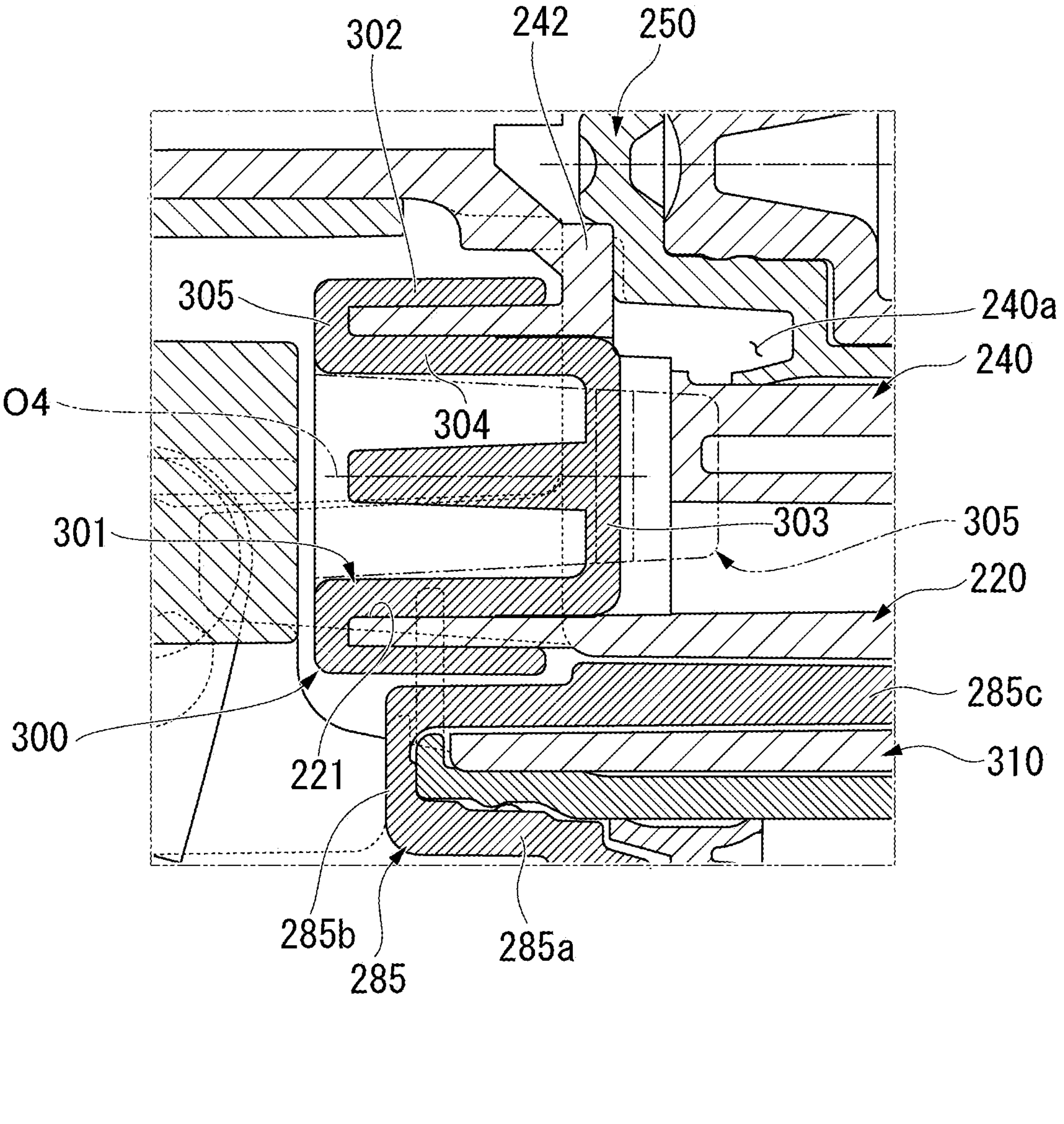
FIG. 6 is an enlarged cross-sectional view of an area around a closing plug shown in FIG. 4 in an enlarged manner.
Figure 7:
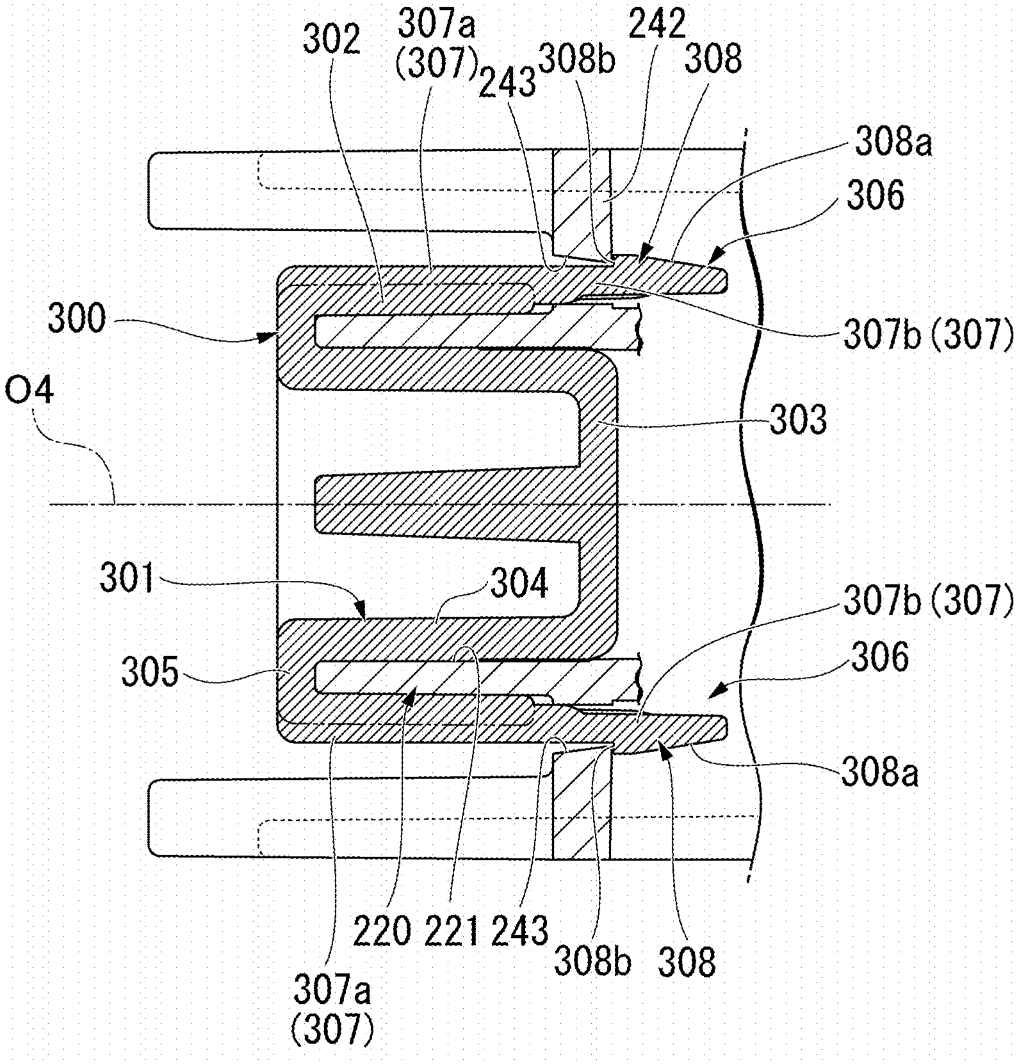
FIG. 7 is a transverse sectional view of the closing plug shown in FIG. 5 cut in a lateral direction of the trigger-type liquid ejector.
Figure 8:
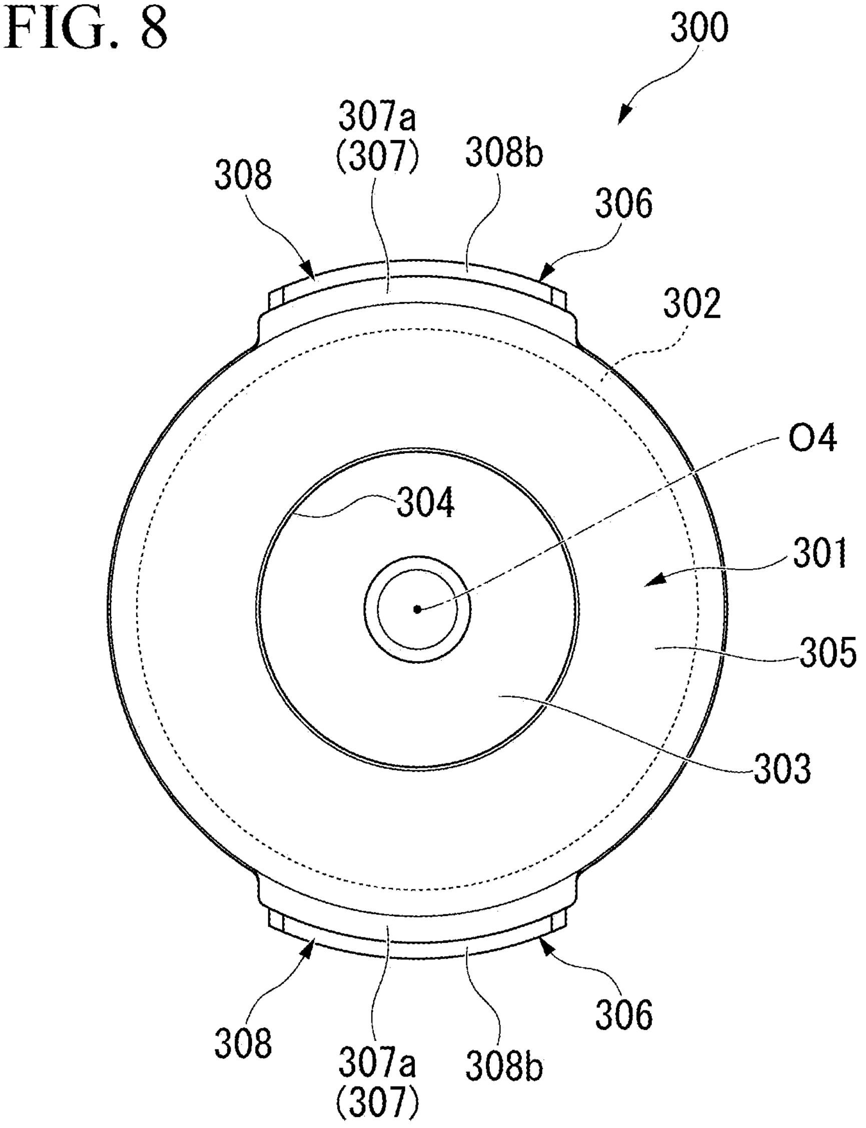
FIG. 8 is a front view of the closing plug shown in FIG. 7 viewed from the front.

As shown in FIGS. 6 to 8, the closing plug 300 includes the plug main body 301 which is fitted to the inward side of the connection tube portion 220 and closes the opening portion 221, and a restraint tube (an outer tube according to the present invention) 302 which is formed integrally with the plug main body 301 in a manner of surrounding the connection tube portion 220 from the outward side in the radial direction and is fitted to the outward side of the connection tube portion 220, and the closing plug 300 is disposed coaxially with the axis O4. In the present embodiment, the closing plug 300 in which the plug main body 301 and the restraint tube 302 are integrally formed will be described as an example. However, the embodiment is not limited to the case where the plug main body 301 and the restraint tube 302 are integrally formed, and the plug main body 301 and the restraint tube 302 may also be separately formed.

The plug main body 301 includes a closing wall 303 which closes the opening portion 221, and an inner tube 304 which is tightly fitted to the inward side of the connection tube portion 220 and is joined to an outer circumferential edge portion of the closing wall 303. Accordingly, the plug main body 301 is formed in a bottomed tubular shape opening forward and having a closed rear side. The plug main body 301 enters the inward side of the connection tube portion 220 of the opening portion 221 from the front and closes the opening portion 221.

Moreover, the plug main body 301 has a flange portion 305 which protrudes toward the outward side in the radial direction from a front end portion of the inner tube 304 and comes into contact with a front end opening edge of the connection tube portion 220 from the front. In the illustrated example, the flange portion 305 is formed in an annular shape extending over the whole circumference of the front end portion of the inner tube 304.

The restraint tube 302 is formed to continuously extend over the whole circumference of the connection tube portion 220 in a manner of surrounding a part of the connection tube portion 220 positioned in front of the front wall portion 242 from the outward side in the radial direction. Further, the restraint tube 302 is tightly fitted over the whole circumference on the outward side of a part of the connection tube portion 220 positioned in front of the front wall portion 242. Accordingly, the closing plug 300 is mounted with the connection tube portion 220 sandwiched between the inner tube 304 and the restraint tube 302 of the plug main body 301 in the radial direction. In addition to being formed integrally with the plug main body 301, since the restraint tube 302 is formed to continuously extend over the whole circumference of the connection tube portion 220 in a manner of surrounding the connection tube portion 220 from the outward side in the radial direction, a front end portion of the restraint tube 302 and an outer circumferential edge portion of the flange portion 305 are joined over the whole circumference.

Moreover, the closing plug 300 of the present embodiment includes locking pieces 306 which are formed integrally with the restraint tube 302 and are locked with the front wall portion 242. A plurality of locking pieces 306 are formed with an interval therebetween in the circumferential direction. In the illustrated example, a pair of locking pieces 306 are formed in a manner of facing each other with the axis O4 sandwiched therebetween in the lateral direction. The pair of locking pieces 306 each include an extension portion 307 which extends rearward along the axis O4 (along the connection tube portion 220) from the front end portion of the restraint tube 302, and a locking projection (an locking portion according to the present invention) 308 which protrudes toward the outward side in the radial direction from a rear end portion of the extension portion 307 and is locked with a locking hole (a locked portion according to the present invention) 243 formed in the front wall portion 242.

A part of the extension portion 307 formed from the front end portion to the rear end portion of the restraint tube 302 functions as a forward extension portion 307*a*. A part of the extension portion 307 extending rearward beyond the rear end portion of the restraint tube 302 functions as a rearward extension portion 307*b*. The entire extension portion 307 is formed to have a uniform circumferential width in the circumferential direction. The forward extension portion 307*a* is formed to overlap an outer circumferential surface of the restraint tube 302. The rearward extension portion 307*b* is inserted into the locking hole 243 formed in the front wall portion 242 from the front. Accordingly, a rear end portion of the rearward extension portion 307*b* is positioned behind the locking hole 243. The locking hole 243 is formed to penetrate the front wall portion 242 in the forward-rearward direction and is formed in an arc shape in a plan view extending in the circumferential direction in a manner corresponding to the shape of the rearward extension portion 307*b*.

The locking projection 308 protrudes toward the outward side in the radial direction from the rear end portion of the rearward extension portion 307*b* and is locked with an opening circumferential edge of the locking hole 243 from behind. Accordingly, the entire closing plug 300 is locked by the locking projection 308 and is thereby prevented from coming off forward.

Particularly, in the locking projection 308 of the present embodiment, an outer surface facing the outward side in the radial direction is an inclined surface 308*a* of which the amount of protruding to the outward side in the radial direction decreases as it goes rearward. Accordingly, the rearward extension portion 307*b* including the locking projection 308 has a shape which is likely to be inserted into the locking hole 243 from the front side and has a shape which is less likely to come off forward from the inside of the locking hole 243. In addition to this, in the locking projection 308, a front end surface (locking surface) 308*b* facing forward along the axis O4 is formed as a flat surface facing the opening circumferential edge of the locking hole 243. Accordingly, the rearward extension portion 307*b* including the locking projection 308 has a shape which is less likely to come off forward from the inside of the locking hole 243.

(Operation of Trigger-Type Liquid Ejector)

Next, a case of using the trigger-type liquid ejector 201 constituted as described above will be described. A state where each portion inside the trigger-type liquid ejector 201 can be filled with a liquid and the liquid can be suctioned up into the vertical supply tube portion 210 through a plurality of times of operations of the trigger portion 281 shown in FIG. 4.

First, the stopper 341 is removed from the gap between the receiving member 285 and the trigger portion 281 by rotating the stopper member 340 together with the nozzle member 203. Accordingly, the first switching grooves 326 and the second switching groove 333 communicate with each other, and ejection state switches to the ejection allowing state allowing ejection of a liquid through the ejection hole 204. Next, if the trigger portion 281 is operated to be pulled rearward against a biasing force of the coil spring 284, the main piston 283 moves rearward from the forefront position and the inside of the main cylinder 282 is compressed. Accordingly, a liquid inside the main cylinder 282 is supplied to the vertical supply tube portion 210. A liquid supplied to the vertical supply tube portion 210 presses the ball valve 290 downward and pushes up the storage valve 291.

Accordingly, a liquid inside the vertical supply tube portion 210 can be supplied to the storage space 240*a* of the storage cylinder 240 through the inside of the connection tube portion 220 and the supply hole 241, and the storage space 240*a* can be compressed. For this reason, along with compression of the storage space 240*a*, the storage plunger 250 can be moved rearward from the most advanced position against a biasing force of the biasing member 260, and a liquid can be stored in (fill) the storage space 240*a*. Further, since the storage plunger 250 moves rearward, a liquid in the storage space 240*a* at a high pressure can be led to the ejection hole 204 through the inside of the spouting tube portion 270. Accordingly, a liquid can be ejected forward through the ejection hole 204.

As described above, every time an operation of pulling the trigger portion 281 rearward is performed, a liquid can be ejected through the ejection hole 204, and a liquid can be stored inside the storage space 240*a* by moving the storage plunger 250 rearward.

Thereafter, if the trigger portion 281 is released, the trigger portion 281 makes forward restoration movement due to an elastic restoring force (biasing force) of the coil spring 284. Therefore, along with this, the main piston 283 makes forward restoration movement inside the main cylinder 282. For this reason, since the pressure inside the main cylinder 282 can be made lower than the pressure inside the container body 20A through decompression, the ball valve 290 can be raised in a state where the storage valve 291 remains closed. Therefore, a liquid inside the container body 20A can be suctioned up into the vertical supply tube portion 210 and can be introduced into the main cylinder 282. Accordingly, it is possible to prepare for a next ejection.

If a rearward operation of the trigger portion 281 is stopped, although supply of a liquid to the storage space 240*a* through the inside of the vertical supply tube portion 210 and the inside of the connection tube portion 220 stops, the storage plunger 250 starts to move forward toward the most advanced position due to a biasing force of the biasing member 260. At this time, outflow of a liquid from the storage space 240*a* to the inside of the vertical supply tube portion 210 is restricted by the storage valve 291.

Accordingly, a liquid stored in the storage space 240*a* can be led to the ejection hole 204 through the inside of the spouting tube portion 270, and a liquid can be continuously ejected forward through the ejection hole 204. In this manner, not only when performing an operation of pulling the trigger portion 281 rearward, even when the trigger portion 281 is not being operated, a liquid can be ejected and a liquid can be continuously ejected.

As described above, according to the trigger-type liquid ejector 201 of the present embodiment, not only when performing an operation of pulling the trigger portion 281 rearward, even when the trigger portion 281 is not being operated, a liquid can be ejected and a liquid can be continuously ejected. In the trigger portion 281, since the upper end portion (fulcrum) is pivotally supported by the relay member 320 in a rockable manner and the main piston 283 is locked with an intermediate portion (point of action) of the trigger portion 281, for example, the main piston 283 can be efficiently moved utilizing the principle of the lever by operating the lower end portion (point of force) of the trigger portion 281. For this reason, operability of the trigger portion 281 can be improved.

Moreover, according to the trigger-type liquid ejector 201 of the present embodiment, as shown in FIGS. 4 to 6, the opening portion 221 of the connection tube portion 220 communicating with the inside of the vertical supply tube portion 210 and the inside of the storage cylinder 240 is closed (sealed) by the closing plug 300. Particularly, the closing plug 300 is mounted with the connection tube portion 220 sandwiched therebetween in the radial direction utilizing the plug main body 301 fitted to the inward side of the connection tube portion 220 and the restraint tube 302 fitted to the outward side of the connection tube portion 220 over the whole circumference. Therefore, even if the internal pressure in the connection tube portion 220 is high and this makes the plug main body 301 receive a stress causing it to come out and fall from the inside of the opening portion 221, forward movement of the entire closing plug 300 with respect to the connection tube portion 220 can be curbed by being sandwiched between the plug main body 301 and the restraint tube 302. Accordingly, unintentional positional deviation or the like of the closing plug 300 can be curbed, appropriate sealability of the opening portion 221 can be maintained, and occurrence of liquid leakage or the like can be prevented.

In addition to this, when the internal pressure in the connection tube portion 220 is high, the connection tube portion 220 is likely to be deformed in a manner of expanding to the outward side in the radial direction due to the internal pressure. At this time, for instance, when the closing plug 300 is not equipped with the restraint tube 302 and is equipped with only the plug main body 301, there is a probability that a gap will be formed between the plug main body 301 and the connection tube portion 220 and liquid leakage or the like will be caused. However, since the restraint tube 302 of the closing plug 300 is formed to extend over the whole circumference of the connection tube portion 220 in a manner of surrounding the connection tube portion 220 from the outward side and is fitted to the outward side of the connection tube portion 220 over the whole circumference, deformation of the connection tube portion 220 expanding to the outward side in the radial direction can be curbed utilizing the restraint tube 302. For this reason, a gap is less likely to be formed between the plug main body 301 and the connection tube portion 220 so that high sealability can be realized. From this, it is possible to provide the trigger-type liquid ejector 201 suitable for continuous jetting. Moreover, since the plug main body 301 is formed in a bottomed tubular shape having the inner tube 304, for instance, even when the connection tube portion 220 is deformed in a manner of expanding to the outward side in the radial direction, the inner tube 304 is likely to be deformed in a manner of expanding to the outward side in the radial direction so as to follow the deformation of the connection tube portion 220. Even with this, a gap is less likely to be formed between the plug main body 301 and the connection tube portion 220 and high sealability can be realized.

Moreover, in the present embodiment, in addition to mounting the closing plug 300 utilizing the plug main body 301 and the restraint tube 302 with the connection tube portion 220 sandwiched therebetween in the radial direction, the locking pieces 306 are locked with the ejector main body 202. Specifically, the locking projection 308 formed in the extension portion 307 is locked with the locking hole 243 formed in the ejector main body 202. Accordingly, disconnection or the like of the closing plug 300 can be prevented so that movement of the closing plug 300 causing it to come out and fall from the inside of the opening portion 221 can be effectively curbed. Therefore, even when the internal pressure in the connection tube portion 220 becomes high, sealability of the opening portion 221 can be maintained more appropriately. Particularly, since the locking projection 308 is formed in the rearward extension portion **307*b*, for example, the locking projection 308 can be locked with the locking hole 243 while the rearward extension portion 307*b* is caused to suitably deflect in the radial direction. Therefore, mounting work of the closing plug 300 with respect to the opening portion 221** can be easily performed.

Moreover, since the plug main body 301 is formed in a bottomed tubular shape having the closing wall 303 and the inner tube 304, the lightweight plug main body 301 can be formed. Furthermore, for example, since the amount of synthetic resin required to form the plug main body 301 can be reduced, it is easy to reduce costs. Moreover, since the plug main body 301 can be mounted on the inward side of the opening portion 221 such that the flange portion 305 comes into contact with the front end opening edge of the connection tube portion 220, it is easy to positionally set a mounting position of the plug main body 301 and it is easy to perform mounting work.

Hereinabove, embodiments of the present invention have been described, but these embodiments are presented as examples and are not intended to limit the scope of the invention. The embodiments can be performed in various other forms, and various omissions, replacements, and changes can be made within a range not departing from the gist of the invention. For example, the embodiments and modification examples thereof include those that can be easily conceived by those who skilled in the art, those that are substantially the same, those within an equivalent range, and the like.

For example, in the foregoing embodiments, a case where a pair of locking pieces 306 constituting the closing plug 300 are provided in a manner of facing each other with the axis O3 sandwiched therebetween has been described as an example, but the embodiments are not limited to this case. For example, only one locking piece 306 may be formed, or three or more may be formed with an interval therebetween in the circumferential direction.

Moreover, in the foregoing embodiments, a case where the plug main body 301 is formed in a bottomed tubular shape has been described as an example, but the embodiments are not limited to this case. For example, the plug main body 301 may be formed in a solid columnar shape and may be fitted to the inward side of the opening portion 221.

Moreover, as described above, as long as the restraint tube 302 is formed to extend over the whole circumference of the connection tube portion 220 in a manner of surrounding the connection tube portion 220 from the outward side in the radial direction, it may be formed integrally with the plug main body 301 or may be separately formed. Moreover, when the restraint tube 302 and the connection tube portion 220 are integrally formed, for example, window-shaped cutout holes may be formed side by side with an interval therebetween (to be disposed intermittently) in the circumferential direction between the front end portion of the restraint tube 302 and the outer circumferential edge portion of the flange portion 305. Accordingly, mountability of the closing plug 300 can be improved.

INDUSTRIAL APPLICABILITY

According to a trigger-type liquid ejector of the present invention, deformation of an ejector main body having a trigger mechanism can be curbed, and it is also possible to provide a trigger-type liquid ejector in which appropriate sealability can be maintained by a closing plug.

REFERENCE SIGNS LIST

1 Trigger-type liquid ejector
2 Ejector main body
3 Nozzle member
4 Ejection hole
5 Cover body
**5*a*** Lower surface
10 Vertical supply tube portion
11 Pipe

12 Outer tube
12*a* Large diameter portion
12*b* Small diameter portion
12*c* Annular coupling portion
12*d* Insertion tube portion
13 Inner tube
13*a* Large diameter portion
13*b* Small diameter portion
13*c* Annular coupling portion
13*d* Flange portion
13*e* Insertion portion
13*f* Pipe fitting tube
17 Recovery passage
17*a* Communication path
18 Connection passage
18*a* Communication opening
20 Connection tube portion
21 Opening portion
30 Mounting cap
31 Mounting portion
32 Restricting portion
32*a* Upper end portion
40 Storage cylinder
40*a* Storage space
41 Supply hole
50 Storage plunger
60 Plunger biasing member
70 Spouting tube portion
80 Trigger mechanism
81 Trigger portion
82 Main cylinder
82*a* Guide tube
82*b* Recessed portion
83 Main piston
84 Biasing member
85 Sliding portion
85*a* Inner lip portion
85*b* Lip coupling portion
85*c* Outer lip portion
90 Ball valve
91 Storage valve
100 Closing plug
110 Main cylinder mounting tube portion
111 Fitting tube portion
120 Mounting tube portion
121 Nozzle shaft portion
122 Nozzle cap
130 Spring receiver
140 Second restriction portion
A Container body
O1 Axis
O2 Axis
O3 Axis
T Stopper
20A Container body
201 Trigger-type liquid ejector
202 Ejector main body
203 Nozzle member
204 Ejection hole
210 Vertical supply tube portion
220 Connection tube portion
221 Opening portion of connection tube portion
240 Storage cylinder
241 Supply hole
243 Locking hole (locked portion)
250 Storage plunger
280 Trigger mechanism
281 Trigger portion
300 Closing plug
301 Plug main body
302 Restraint tube (outer tube)
303 Closing wall
304 Inner tube
305 Flange portion
306 Locking piece
307 Extension portion
308 Locking projection (locking portion)
O4 Axis

The invention claimed is:

1. A trigger liquid ejector comprising:
a nozzle member in which an ejection hole for ejecting a liquid is formed;
an ejector main body in which the nozzle member is mounted; and
a mounting cap which mounts the ejector main body in a mouth portion of a container body accommodating the liquid,
wherein the ejector main body includes
a vertical supply tube portion which suctions up a liquid inside the container body, and
a trigger mechanism which has a trigger portion provided so as to be movable rearward in a forward biased state, and which causes a liquid to flow from an inside of the vertical supply tube portion toward the ejection hole side in response to rearward movement of the trigger portion, and
the mounting cap includes a restriction portion which is formed in a tubular shape, which is spaced at a gap size from or is in physical contact with the ejector main body in a vertical direction, and which restricts relative displacement between the mounting cap and the ejector main body,
wherein the gap size is equal to or smaller than a thickness of the restriction portion from an outer circumferential surface to an inner circumferential surface,
the trigger mechanism includes:
a main cylinder which communicates with the vertical supply tube portion and opens forward, and
a main piston which has a sliding portion capable of sliding on an inner circumferential surface of the main cylinder and moves in a forward-rearward direction with respect to the main cylinder along with movement of the trigger portion in the forward-rearward direction,
the ejector main body includes a main cylinder mounting tube portion which protrudes forward from the vertical supply tube portion and in which the main cylinder is mounted,
the mounting cap includes a mounting portion which is formed in a tubular shape, in which the vertical supply tube portion is inserted into an inward side thereof and which is mounted in the mouth portion of the container body, and
the restriction portion extends upward from the mounting portion, is spaced at the gap size from or is in physical contact with a lower portion of the main cylinder mounting tube portion, and restricts relative displacement between the mounting cap and the ejector main body.

2. The trigger liquid ejector according to claim 1 further comprising:
a second restriction portion which extends downward from the lower portion of the main cylinder mounting tube portion, which is spaced at the gap size from or is in physical contact with a front side of the mounting cap, and which restricts relative displacement between the mounting cap and the ejector main body.

3. A trigger liquid ejector comprising:
a nozzle member in which an ejection hole for ejecting a liquid is formed;
an ejector main body in which the nozzle member is mounted; and
a mounting cap which mounts the ejector main body in a mouth portion of a container body accommodating the liquid,
wherein the ejector main body includes
a vertical supply tube portion which suctions up a liquid inside the container body, and
a trigger mechanism which has a trigger portion provided so as to be movable rearward in a forward biased state, and which causes a liquid to flow from an inside of the vertical supply tube portion toward the ejection hole side in response to rearward movement of the trigger portion, and
the mounting cap includes a restriction portion which is formed in a tubular shape, which is spaced at a gap size from or is in physical contact with the ejector main body in a vertical direction, and which restricts relative displacement between the mounting cap and the elector main body,
wherein the gap size is equal to or smaller than a thickness of the restriction portion from an outer circumferential surface to an inner circumferential surface,
the ejector main body includes:
a storage cylinder into which the liquid that has passed through the inside of the vertical supply tube portion is supplied in response to rearward movement of the trigger portion, and
a storage plunger which is provided inside the storage cylinder so as to be movable in an axial direction along a center axis of the storage cylinder, moves toward one side in the axial direction along with supply of the liquid to the inside of the storage cylinder, and is biased toward the other side.

4. A trigger type liquid ejector comprising:
an ejector main body which is mounted in a container body accommodating a liquid; and
a nozzle member which is mounted in the ejector main body, and in which an ejection hole for ejecting a liquid is formed,
wherein the ejector main body includes
a vertical supply tube portion which suctions up a liquid inside the container body,
a connection tube portion which extends from the vertical supply tube portion, and which has an opening portion opening to an outside of the ejector main body,
a trigger mechanism which has a trigger portion provided so as to be movable rearward in a forward biased state, and which causes the liquid to flow from the vertical supply tube portion toward the ejection hole side through an inside of the connection tube portion in response to rearward movement of the trigger portion,
a storage cylinder in which a supply hole communicating with the inside of the connection tube portion is formed, and into which the liquid that has passed through the inside of the vertical supply tube portion and the inside of the connection tube portion is supplied through the supply hole in response to rearward movement of the trigger portion, and
a storage plunger which is provided inside the storage cylinder so as to be movable in an axial direction along a center axis of the storage cylinder, which moves toward one side in the axial direction along with supply of a liquid to the inside of the storage cylinder, and which is biased toward the other side,
the connection tube portion is provided with a closing plug which is mounted so as to close the opening portion, and
the closing plug includes
a plug main body which is fitted to the inward side of the connection tube portion, and which closes the opening portion, and
an outer tube which is formed to extend over a whole circumference of the connection tube portion in a manner of surrounding the connection tube portion from an outward side in a radial direction, and which is fitted to an outward side of the connection tube portion over the whole circumference.

5. The trigger liquid ejector according to claim 4,
wherein the closing plug includes a locking piece which is formed integrally with the outer tube, and which is locked with the ejector main body, and
the locking piece includes
an extension portion which extends toward the vertical supply tube portion beyond the outer tube along the connection tube portion, and
a locking portion which is formed to protrude in the radial direction of the connection tube portion from the extension portion and is locked with an locked portion formed in the ejector main body.

6. The trigger liquid ejector according to claim 5,
wherein the plug main body includes
a closing wall which closes the opening portion,
an inner tube which is joined to an outer circumferential edge portion of the closing wall, and which is fitted to the inward side of the connection tube portion, and
a flange portion which protrudes toward the outward side of the connection tube portion in the radial direction from the inner tube, and which comes into contact with an opening edge of the connection tube portion.

7. The trigger liquid ejector according to claim 1,
wherein the vertical supply tube portion includes:
an inner tube, and
an outer tube externally coupled to the inner tube,
the inner tube is provided with an insertion portion into which a part of the outer tube is inserted in the vertical direction, and
the restriction portion is formed in the tubular shape surrounding an outward side of the insertion portion.

8. The trigger liquid ejector according to claim 3,
wherein the vertical supply tube portion includes:
an inner tube, and
an outer tube externally coupled to the inner tube,
the inner tube is provided with an insertion portion into which a part of the outer tube is inserted in the vertical direction, and
the restriction portion is formed in the tubular shape surrounding an outward side of the insertion portion.

* * * * *